United States Patent [19]
Zou

[11] Patent Number: 6,160,796
[45] Date of Patent: Dec. 12, 2000

[54] METHOD AND SYSTEM FOR UPDATING DEVICE IDENTIFICATION AND STATUS INFORMATION AFTER A LOCAL BUS RESET WITHIN A HOME AUDIO/VIDEO NETWORK

[75] Inventor: Feng (Frank) Zou, Milpitas, Calif.

[73] Assignees: Sony Corporation of Japan, Tokyo, Japan; Sony Electronics, Inc., Park Ridge, N.J.

[21] Appl. No.: 09/003,118

[22] Filed: Jan. 6, 1998

[51] Int. Cl.[7] .................................................. G06F 13/00
[52] U.S. Cl. ............................................. 370/257; 710/104
[58] Field of Search .................................... 370/254, 257, 370/389, 390, 402, 408, 437, 438, 439, 451, 453, 457; 709/221, 222, 300; 710/8, 9, 10, 11, 104

[56] References Cited

U.S. PATENT DOCUMENTS

| | | | |
|---|---|---|---|
| 4,893,199 | 1/1990 | Okada | 360/48 |
| 5,420,573 | 5/1995 | Tanaka et al. | 340/825.24 |
| 5,537,605 | 7/1996 | Teece | 395/800 |
| 5,724,517 | 3/1998 | Cook et al. | 709/222 |
| 5,764,930 | 6/1998 | Staats | 709/221 |
| 5,815,678 | 9/1998 | Hoffman et al. | 709/222 |

FOREIGN PATENT DOCUMENTS

| | | | |
|---|---|---|---|
| 2767795 | 3/1989 | Japan | H04L 5/22 |

*Primary Examiner*—Chi H. Pham
*Assistant Examiner*—Frank Duong
*Attorney, Agent, or Firm*—Wagner Murabito & Hao LLP

[57] ABSTRACT

A method and system for updating device identification and status information in response to a local bus reset within a home audio/video network. Several consumer electronics products, e.g., television, VCR, tuner, set-top box (e.g., intelligent receiver/decoder, IRD), DVTRs, PCs, DVD players (digital video disk), etc., can be coupled within the network to communicate together via a standard bus (e.g., IEEE 1394 serial communication bus). In one embodiment, the communication architecture used is the home audio/visual initiative (HAVI) format. The HAVI network offers unique advantages consumer electronic vendors because the architecture offers for the home network many of the advantages of existing computer system networks. Namely, interconnected devices can share resources and provide open, well defined APIs that allow ease of development for third party developers. The present invention provides a mechanism whereby devices of the network are informed of the current status of the network after a local bus reset caused when a device is inserted into the network or when a device is removed from the network. After a reset, a new GUID list is generated by a driver and passed to a high level program. The high level program then compares the new GUID list with its own copy of an older version and generates a list of devices added to the network after the bus reset and a list of devices removed from the network after the bus reset. This information is then forwarded to all devices on the network that previously specified certain call back information regarding current device status.

20 Claims, 26 Drawing Sheets

METHOD AND SYSTEM FOR UPDATING DEVICE IDENTIFICATION AND STATUS INFORMATION AFTER A LOCAL BUS RESET WITHIN A HOME AUDIO/VIDEO NETWORK

BACKGROUND OF THE INVENTION

1. Field of the Invention

The present invention relates to the field of communication systems. More specifically, the present invention relates to equipment for home audio/video electronics.

2. Related Art

A typical home audiovisual equipment complement includes a number of components, e.g., a radio receiver, a CD player, a pair of speakers, a television, a VCR, a tape deck, etc. Components are connected to each other via sets of wires. One component is usually the central component of the home audiovisual system. This is usually the radio receiver, or the tuner/decoder. The control buttons and control switches are usually located on the front of the tuner and in many cases, some or all of these buttons and switches are duplicated on a hand held remote control unit. A user controls the home equipment by manipulating the buttons and switches on the front of the tuner, or alternatively, manipulating buttons on the hand held remote control unit.

As consumer electronic devices have become more capable and more complex, demand for the latest and most capable devices has increased. As new devices emerge and become popular, new devices are purchased by consumers and "plugged" into their home audiovisual systems. The new device is simply plugged into the system alongside the pre-existing, older devices (e.g., cassette tape deck, CD player, and the like). The new device is plugged into an open input on the back of the tuner, or some other device coupled to the tuner. The consumer (e.g., the user) controls the new device via control switches on the new device itself, or via a separate remote control unit for the new device.

As the number of new consumer electronics devices for the home audiovisual system has grown and as the sophistication and capabilities of these devices have increased, a number of problems with the conventional paradigm emerge. One such problem is incompatibility between devices in the home audiovisual system. In addition, where one device is much newer than another device additional incompatibilities may exist For example, a new device might incorporate hardware (e.g., specific inputs and outputs) which enables more sophisticated remote control functions. This hardware may be unusable with older devices within the system. Another problem is the lack of functional support for differing devices within an audiovisual system. For example, even though a television may support advanced sound formats (e.g., surround sound, stereo, etc.), if an older less capable tuner does not support such functionality, the benefits of the advanced sound formats car be lost. Another problem is the proliferation of controls for the new and differing devices within the home audiovisual system. Each new device coupled to the audiovisual system often leads to another dedicated remote control unit for the user to keep track of and learn to operate.

In view of the above, it is desired to provide a communication architecture in which consumer electronics devices can be integrated. In so doing, the consumer electronics devices can offer and be expanded to include advanced communications and control functionality between themselves not heretofore offered. Within such communication architecture integrating consumer electronic devices ("a consumers electronics network"), devices can communicate with each other and control one another. Within a communications network where devices can communicate and control other devices, it is important that devices and associated software objects be aware of the current status of devices in the network to provide effective communication, control and reporting functions. Therefore, what is desired is a system that can efficiently report device status information to other devices and software objects within the communication network while requiring a minimum of high level application effort.

The IEEE 1394 serial communication bus, according to the IEEE 1394 standard, assigns a 6-bit physical identifier value (phy_id) to each device connected to the bus. The IEEE 1394 serial communication bus uses this physical identifier to communicate with a device coupled thereto. Whenever a new device is inserted onto the bus (or powered on), or an existing device is removed from the bus (or powered down), or both, a bus reset is caused. The bus reset initiates certain well known bus recovery communications and functions in accordance with the IEEE 1394 standard.

The above described bus reset initiates certain well known bus recovery communications and functions in accordance with the IEEE 1394 standard, including the possible renumbering of the physical identifiers of the devices remaining on the IEEE 1394 bus after the bus reset. That is to say, the physical identifiers assigned to devices on the IEEE 1394 bus are not always preserved (e.g., not persistent) following a bus reset.

However, it is also desired within the consumer electronics network that high level applications adopt abstract and persistent identifiers for devices within the network. Since many data structures (e.g., speed map and topology map) and communication channels are maintained and implemented within the IEEE 1394 standard using physical identifiers, a problem exists for high level applications that use a persistent identifier for each device but also need to communicate with the devices of the network and/or need access to speed map and topology data. What is desired is a mechanism and method operable within a consumer electronic network that provides an IEEE 1394 communication framework, but also efficiently provides high level applications with a persistent identifier for devices coupled to the network.

SUMMARY OF THE INVENTION

Accordingly, the present invention provides a method and system that can efficiently report device status information to other devices and software objects within the communication network while requiring a minimum of high level application effort. Further, the present invention provides a mechanism and method operable within a consumer electronic network that provides an IEEE 1394 communication framework, but also efficiently provides high level applications with a persistent identifier for devices coupled to the network.

A method and system are described for updating device identification information in response to a local bus reset within a home audio/video network. Within the network, several consumer electronics products, e.g., television, VCR, tuner, set-top box (e.g., intelligent receiver/decoder, IRD), DVTRs, PCs, DVD players (digital video disk), etc., can be coupled to communicate together via a standard bus (e.g., IEEE 1394 serial communication bus). This allows devices of the network to control one another and obtain information regarding one another. In one embodiment, the communication architecture used is the home audio/visual initiative (HAVI) format. The HAVI network offers unique advantages consumer electronic vendors because the architecture offers for the home network many of the advantages of existing computer system networks, namely, interconnected devices can share resources and provide open, well defined APIs that allow ease of development for third party developers. HAVI offers extended interoperability.

Devices can be removed from or inserted into the network while the network is otherwise operable (e.g., hot modifications are allowed). Therefore, it is important that devices be informed of the current status of other devices on the network following a bus reset. The present invention provides a mechanism whereby devices of the network are informed of the current status of the network after a local bus reset which is caused when a device is inserted into the network (including power on) or when a device is removed from the network (including power down). In accordance with the present invention, after a reset, a new GUID list is generated by a driver program and passed to a high level program. The high level program then compares the new (or "current") GUID list with its own copy of the last GUID list version and generates a list of devices added to the network after the bus reset and a list of devices removed from the network after the bus reset. This information is then forwarded to all devices on the network that previously specified certain call back information regarding current device status.

In one embodiment, the high level program is a communications media manager (CMM) that maintains a copy of the available devices (nodes) in the network in the form of a GUID list. The GUID is a persistent 64-bit device identification number that includes a vendor code and a chip series code and thereby uniquely identifies every device in the network. The device or program that has interest in knowing what devices are new and what devices have been removed from the network provides a call back handler to the CMM. When an IEEE 1394 compatible device (or several devices) is inserted in or removed from the local bus, or any other topology change occurs, a bus reset is generated within the network. A low level driver program, a link driver, catches the bus reset, updates the available devices and passes this information (the new GUID list) to the CMM. The CMM compares its version of the GUID list with the new GUID list and creates new information including the new and removed devices. This status information is passed through the call back handler to each interested object. The present invention thereby provides an efficient mechanism for new and/or removed device notification and removes the burden from high level software of maintaining a list of recently added or removed devices.

DETAILED DESCRIPTION OF THE INVENTION

In the following detailed description of the present invention, a method and system for updating device identification and status information in response to a local bus reset within a home audio/video network, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Figure 2:
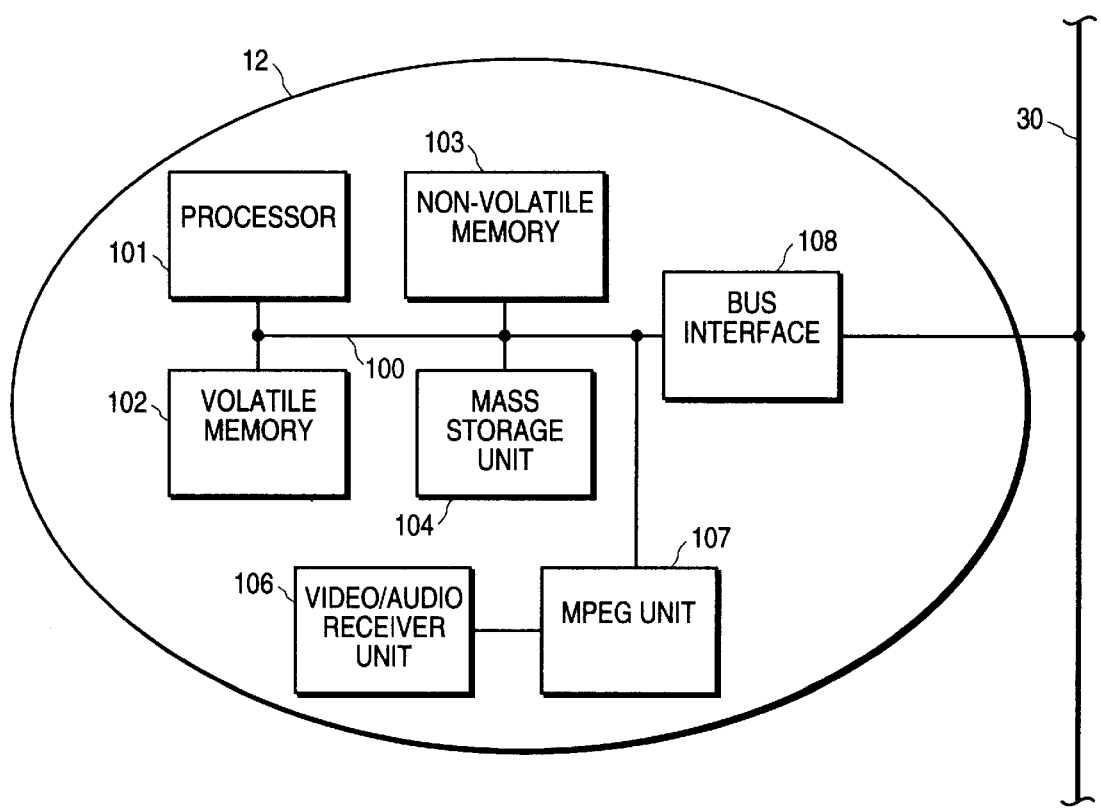
FIG. 2 illustrates internal circuitry of an intelligent receiver/decoder device of the HAVI network of FIG. 1A (acting as a full audio/visual, FAV, node) in accordance with the present invention.

Some portions of the detailed descriptions which follow are presented in terms of procedures, steps, logic blocks, processing, and other symbolic representations of operations on data bits within a computer memory (see FIG. 2). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

HAVI ARCHITECTURE GENERALLY

Embodiments of the present invention are operable within a consumer electronics network of the home audio/visual initiative (HAVI) architecture. Aspects of the HAVI architecture network (e g., "HAVI architecture") are discussed to provide a general framework in which embodiments of the present invention operate.

HAVI is an architecture for inter-operating consumer electronics equipment devices adapted for the home network. The interoperability aspects define an architectural model that allows devices of any vendor to interwork within the home. A feature of the HAVI architecture is the combination of a base set of generic device controls (a device control software module) with a method to extend the base control protocol as new features and devices are deployed.

Figure 1A:
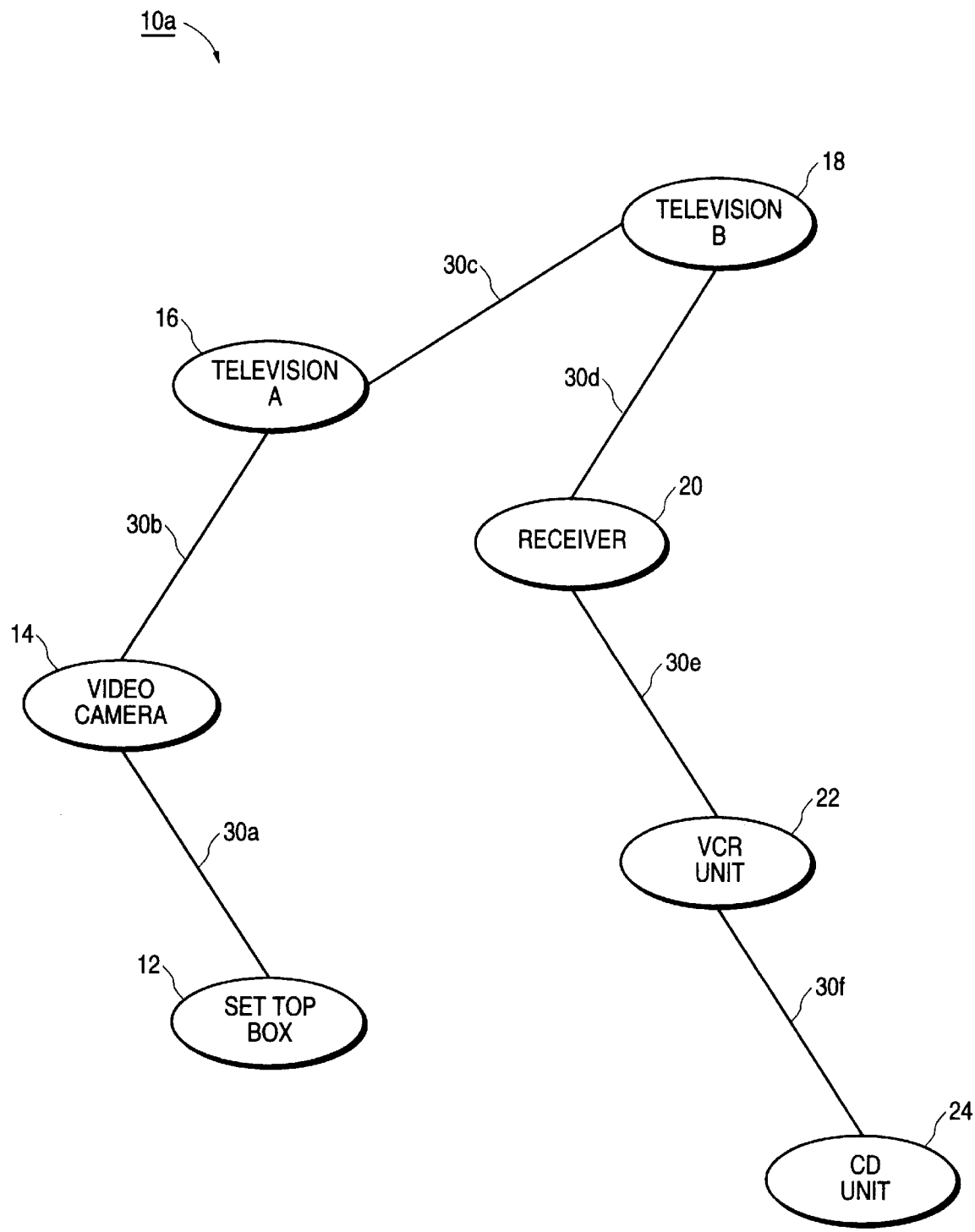
FIG. 1A illustrates a physical port connection topology of an exemplary device configuration of the home audio/visual initiative (HAVI) consumer electronics network in accordance with the present invention.

The HAVI architecture supports a wide range of devices including intelligent receiver/decoders (IRDs), digital video tape records (DVTRs), video cassette recorders (VCRs), personal computers (PCs), digital video disk players (DVDs), etc., communicating via a common messaging system. FIG. 1A illustrates the physical port-to-port connecting configuration 10a of an exemplary HAVI network. Several consumer electronics devices ("devices") 12–24 are shown connected together with bus segments 30a–30f which couple ("plug into") to ports on the respective devices. In one embodiment of the HAVI architecture, the IEEE 1394 serial communication bus standard is used as a local bus platform to provide the common messaging system. The IEEE 1394 serial communication bus carries both commands, status information and well as digital audio and digital video signals between devices.

Figure 1B:
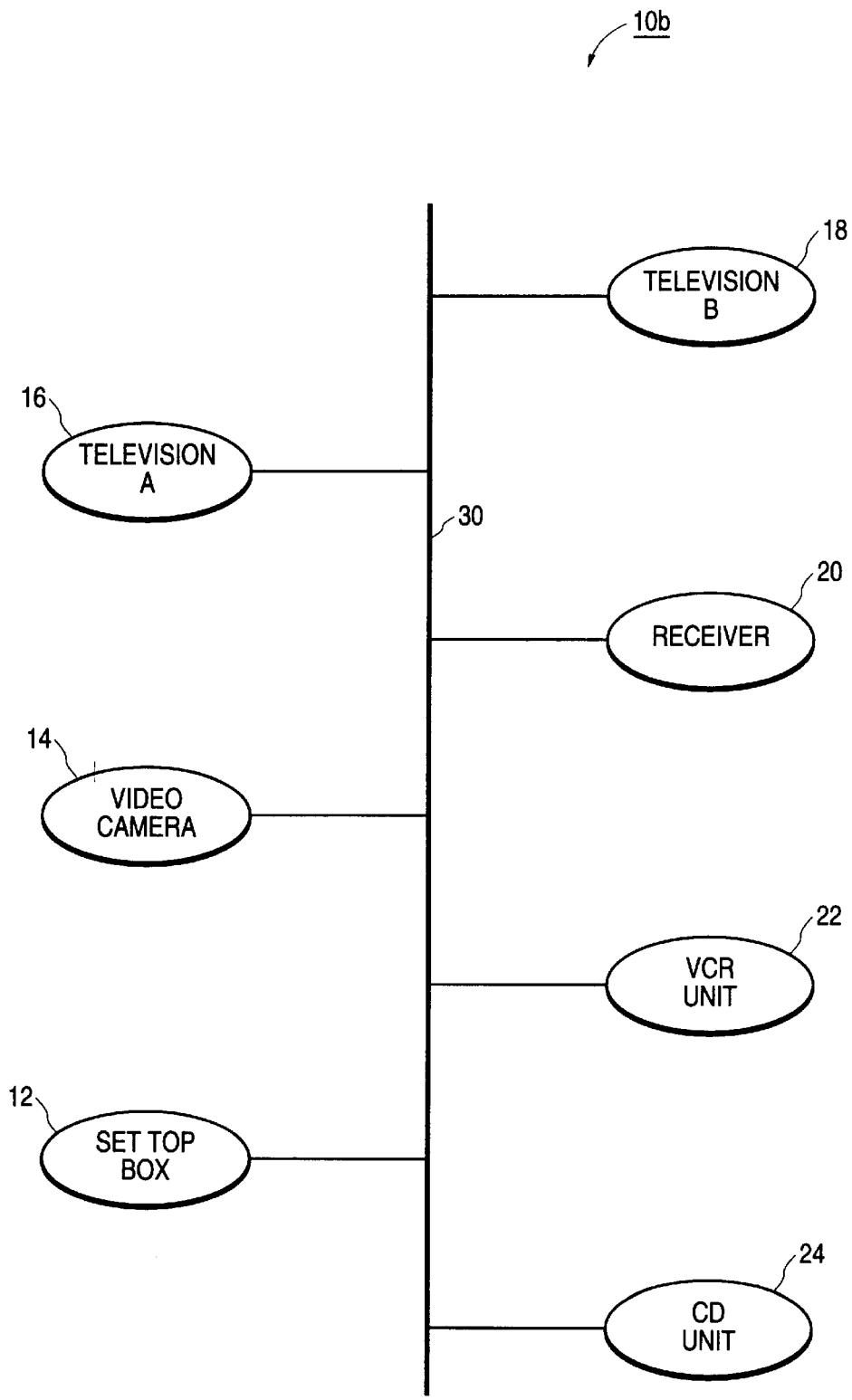
FIG. 1B illustrates a local bus connection topology of the exemplary device configuration illustrated in FIG. 1A in accordance with the present invention.
Figure 1C:
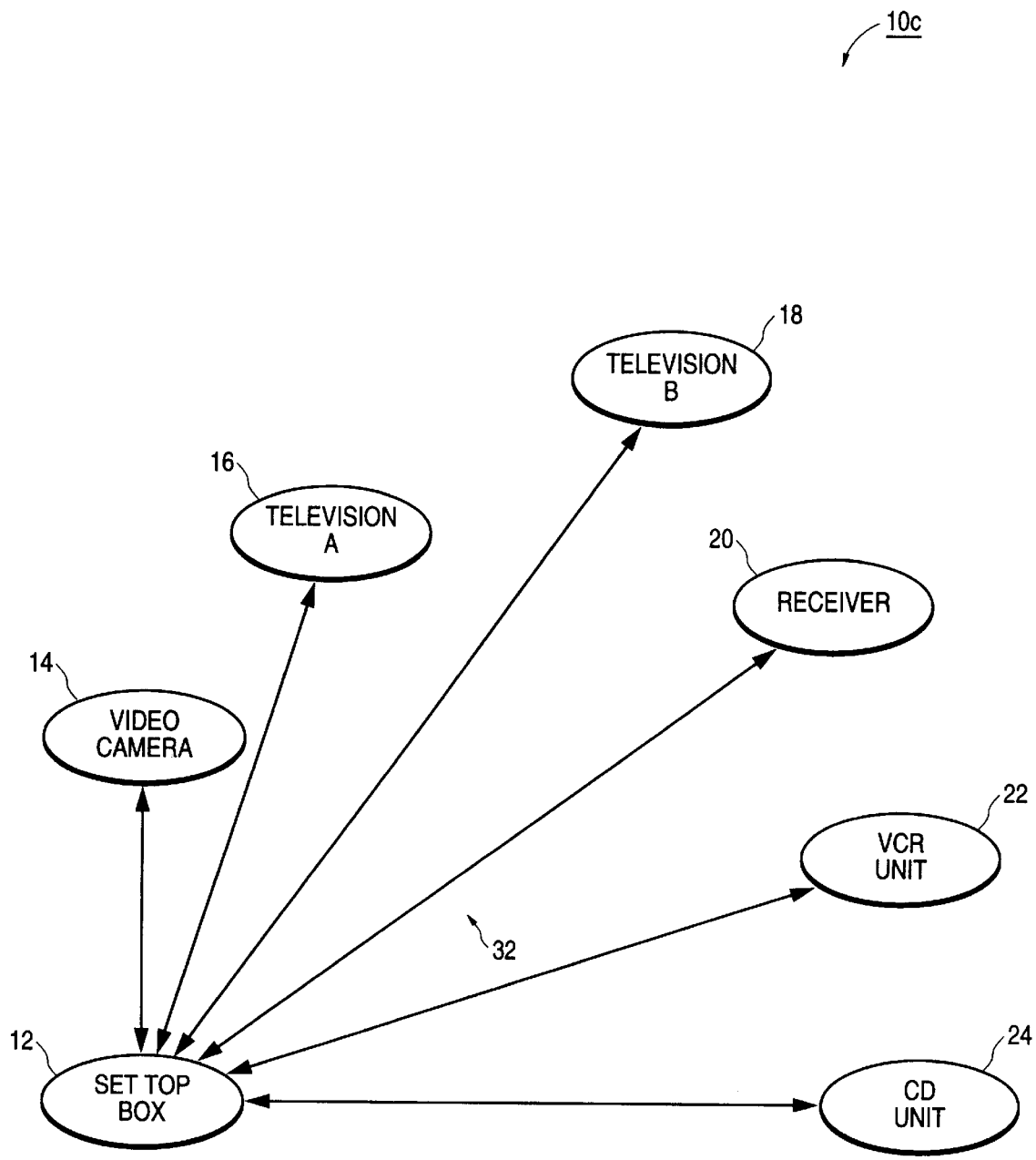
FIG. 1C illustrates a communication channel topology with respect to once device coupled to the HAVI network illustrated in FIG. 1A in accordance with the present invention.

FIG. 1B illustrates a logical bus configuration 10b of the HAVI network of FIG. 1A. As shown in FIG. 1B, all of the devices 12–24 of the HAVI network can be viewed as logically coupled to a common IEEE 1394 serial communication bus 30. Within this bus configuration 10b, peer-to-peer device communication is supported. For example, as shown in FIG. 1C, any device (having appropriate capabilities), e.g., device 12, can send or receive communication packets from any other device in the HAVI network. In the example of FIG. 1C, the set-top-box (e.g., an IRD) can receive messages from or generate messages to any of the other devices 14–24 of the exemplary HAVI network.

The interoperability model in the HAVI architecture provides for the following: 1) support for existing devices; 2) a default control model; 2) a means to extend the default control model when new devices or functionality is brought to market; and 4) a common means for device representation (e.g., graphics user interfaces). To achieve the above, the HAVI architecture defines three types of nodes in the home network. A base AV (BAV) node is defined for devices that already exist in the market (e.g., VCR 22 of FIG. 1A). An intermediate AV (IAV) node is defined for simple devices such as camcorders or DVTRs (e.g., camera 14). A full AV (FAV) node is defined for devices of more resources, such as IRDs or smart televisions (e.g., set-top-box 12). An FAV node (or device) typically contains enough hardware to host control modules and to support application programs locally. The IAV devices and FAV devices communicate by sending messages over the home network using a generic message passing system described more fully below. When new devices join the home network, they are recognized and added to a global name database (registry). The registry holds information about their characteristics and provides a reference to a handler (e.g., communication point) for that device. Other devices and services are able to query the registry to locate a device and then, using the handler, can interact with the device.

When a device is initially added to the home network, the system queries the device to ascertain its characteristics and capabilities. Once a device's characteristics are known, the architecture provides two methods of controlling it. The first method, level one interoperability, uses a predefined message set based on IEEE 1394 AV/C-CTS. All IAV and FAV nodes can use this command set to access and control other devices, however, BAV nodes, because they are deployed before the architecture was defined, are controlled using legacy protocols. The level one interoperability provides a default level of control. The FAV nodes act as control nodes and create a local representation of the IAV node, known as a device control module (DCM), that provides an API used to send control commands to the device.

Level two interoperability within the HAVI architecture goes farther and supports future added functionality and new devices. To achieve this, a particular device can carry within its ROM an override DCM that is uploaded from the IAV device, to the FAV device, and replaces the default DCM for the particular device. This override DCM not only contains the basic level one command set for the particular device but also includes vendor specific commands to control advanced features of the device. This model allows the device to inform another object about its particular functionality. Since the override DCM may be loaded onto any vendor's FAV, the format of the DCM is architecture-neutral.

To allow one device to discover the capabilities of another device and to determine which command set to use with that device, a standard device description structure is provided called the self describing data (SDD) structure. The SDD data structure is extensible. It car be a small number of bytes describing the device type, e.g., TV, or VTR etc. Alternatively, the SDD data structure can be a more complex structure also defining the override DCM and a graphical representation of the device. The graphical representation within the SDD data structure allows an FAV node to present a pictorial representation of the devices in the home network to users.

By defining the graphical representation in a sufficiently generic manner, a device's SDD graphical data can be used in any vendor's product to display (e.g., on a television or monitor within the network a user interface for that device. This provides an enhanced level of vendor interoperability and also allows a vendor to differentiate a product while maintaining within the general look and feel of the display device. The SDD also enables a control device (the FAV node) to present a general control user interface for all devices in the home network, irrespective of the differences in type and vendor. Self describing data (SDD) is described in copending provisional application serial No. 60/054,327, entitled "A Method and Apparatus for Including Self-Describing Information within Devices," filed Jul. 31, 1997 and assigned to the assignee of the present invention. The above referenced provisional patent application is hereby incorporated by reference.

Legacy devices are devices that were built before the HAVI architecture or devices that select not to use the HAVI architecture. The HAVI architecture supports Legacy devices by providing Legacy DCMs to provide protocol conversions for Legacy devices. These Legacy DCMs can contain sufficient knowledge to allow them to support an existing 1 or 2 way control protocol and provide a specific control interface to the devices that conform to the HAVI architecture. A legacy DCM acts as a bridge between the Legacy and HAVI devices. This feature allows the HAVI architecture also to interact with any future device control protocols such as, for example, protocols being used for home energy management or security, etc.

SET-TOP-BOX 12 OF FIG. 2

Any consumer electronics device can be provided with the appropriate hardware to act as an FAV and thereby provide a platform for certain HAVI software (described below). For instance, the set-top-box 12 device of the exemplary HAVI network of FIG. 1A contains special hardware components that provide an operation platform for software components of the HAVI architecture. Another example of an FAV is a digital television having the required hardware resources to support HAVI software. Certain aspects of the present invention, described below, are discussed in terms of steps executed on a computer system (e.g., processes 400, 700, 800, 850, 900a, 950a, 900b and 950b). Although a variety of different computer systems can be used with the present invention, an exemplary general purpose computer system is shown in the set-top-box FAV of FIG. 2.

Set-top-box 12 of FIG. 2, in addition to having a video/audio receiver (decoder) unit 106 and MPEG unit 107 also includes an internal address/data bus 100 for communicating information, one or more central processors 101 coupled with the bus 100 for processing information and instructions, a volatile memory 102 (e.g., random access memory RAM) coupled with the bus 100 for storing information and instructions for the central processor 101 and a non-volatile memory 103 (e.g., read only memory ROM) coupled with the bus 100 for storing static information and instructions for the processor 101. Set-top-box 12 can also optionally include a data storage device 104 ("disk subsystem") such as a magnetic or optical disk and disk drive coupled with the bus 100 for storing information and instructions. Also included n the set-top-box 12 is a bus interface unit 108 for interfacing with the local bus 30 (e.g., an IEEE 1394 serial bus). Set-top-box 12 can operate under a variety of different operating systems (e.g., Windows operating system, DOS operating system, Macintosh O/S), but in one embodiment the Aperios operating system is used.

HAVI SOFTWARE ARCHITECTURE

In one embodiment, the software of the HAVI architecture can be broken into three APIs (AVOS, interoperability and application). The AVOS API is a low level system API that abstracts the common operating system services, e.g., threads, communications, and memory. Interoperability APIs are abstractions of common device control models and provide a basic representation model and a means to extend the control model with vendor specific commands. The application API is a high level API for applications including interactive TV applications, and in one embodiment is based on the DAVIC API set including the Motion Hypermedia Expert Group (MHEG) interactive application engine.

Figure 3:
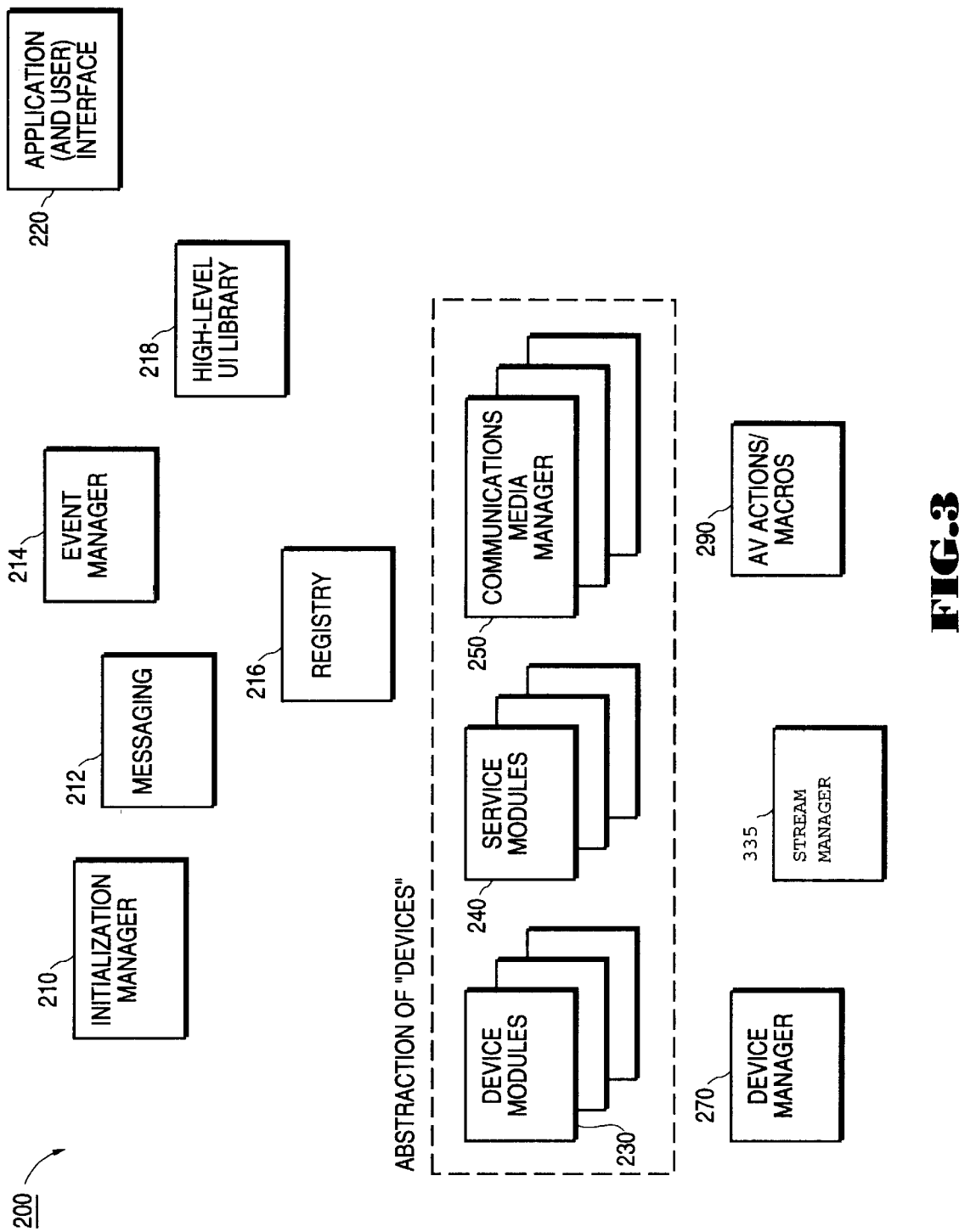
FIG. 3 illustrates a complement of, software services made available by a full audio/visual (FAV) node of the HAVI network in accordance with the present invention.

FIG. 3 illustrates the software architecture 200 used in the HAVI architecture in more detail. The architecture 200 contains several generic components to provide abstractions of common facilities in the home network. A communication media manager 250 is provided and this component abstracts from the underlying transport network. In the case of the IEEE 1394, the communication media manager 250 maintains and generates information regarding the speed maps 515 (FIG. 8) aid topology maps 520 which are used by embodiments of the present invention. A DCM Manager 270 is also provided that is responsible for identifying and creating generic DCMs 230 for level one interoperability. The DCM Manager 270 also hosts override DCMs uploaded from devices or other sites. A Graphics Management unit 220 is provided which supplies generic graphics APIs that applications and DCMs can use to present user interface information.

A Stream Manager 335 of FIG. 3 is used to determine the most effective route for AV streams within the home network. A data format manager is included within the Stream Manager 335 and is responsible for providing conversion of AV streams to and from various formats as they flow between devices in the home network. These operations are described below with reference to FIG. 7A and FIG. 7B. A Messaging Manager 212 supports a generic messaging mechanism that allows devices to locate and interact with other devices in the home network. A communications media manager (CMM) 250 is a media dependent entity in the HAVI software architecture 200. The CMM 250 provides abstract services to other HAVI components or application programs in the HAVI network. It also provides media specific transport mechanisms for actual data communication among various devices in the home network. The CMM 250 is responsible for compiling new GUID status updates upon a local bus reset. It is appreciated that each physical communication media contains its own CMM to serve the above purposes. As one example, the CMM 250 for the IEEE 1394 serial bus is described herein further below.

The Event Manager 214, the Registry 216, the Stream Manager 335 and the Initialization Manager 210 of FIG. 3 are described separately further below.

Figure 4:
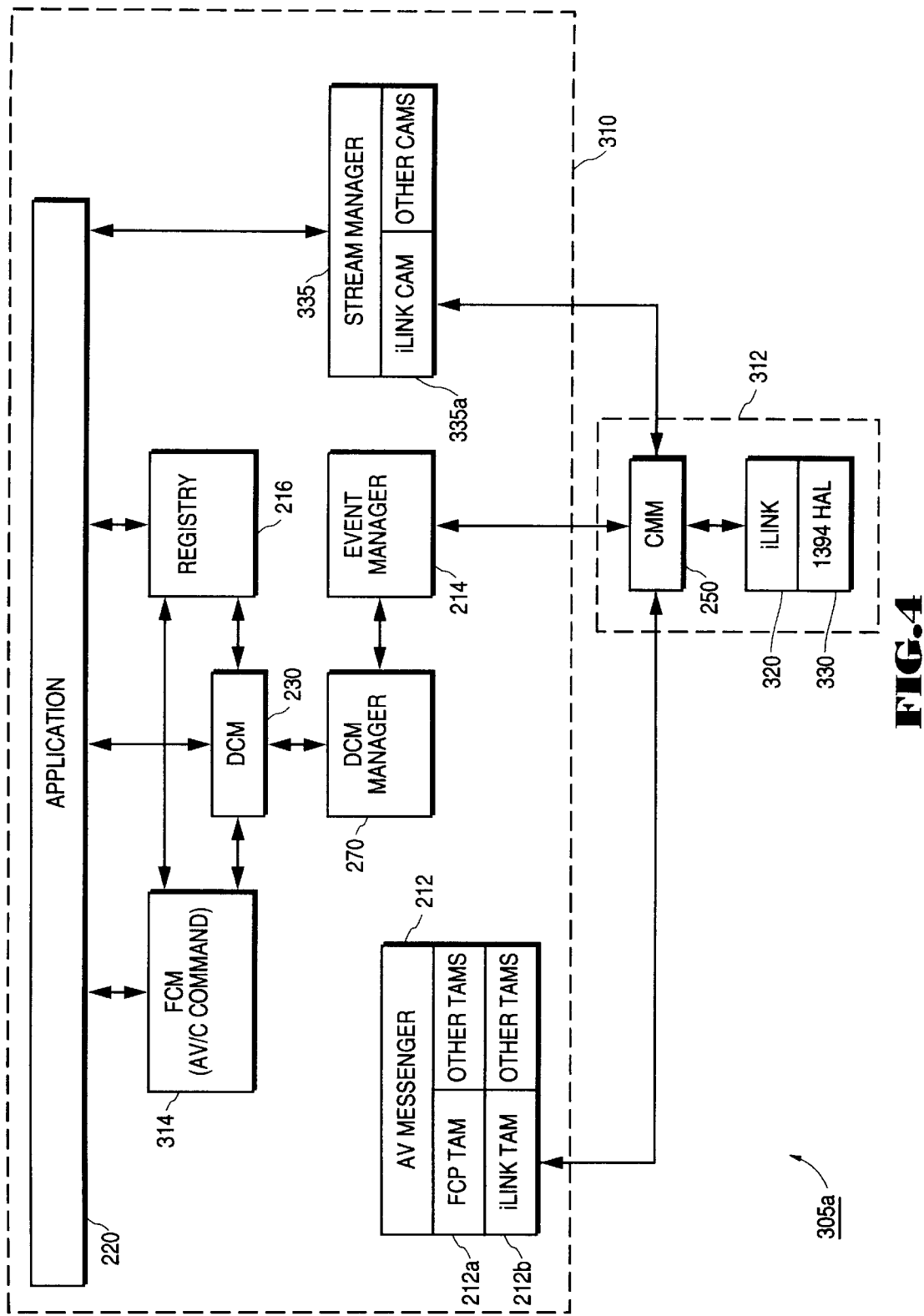
FIG. 4 illustrates communication pathways within the HAVI software architecture in accordance with the present invention.
Figure 8:
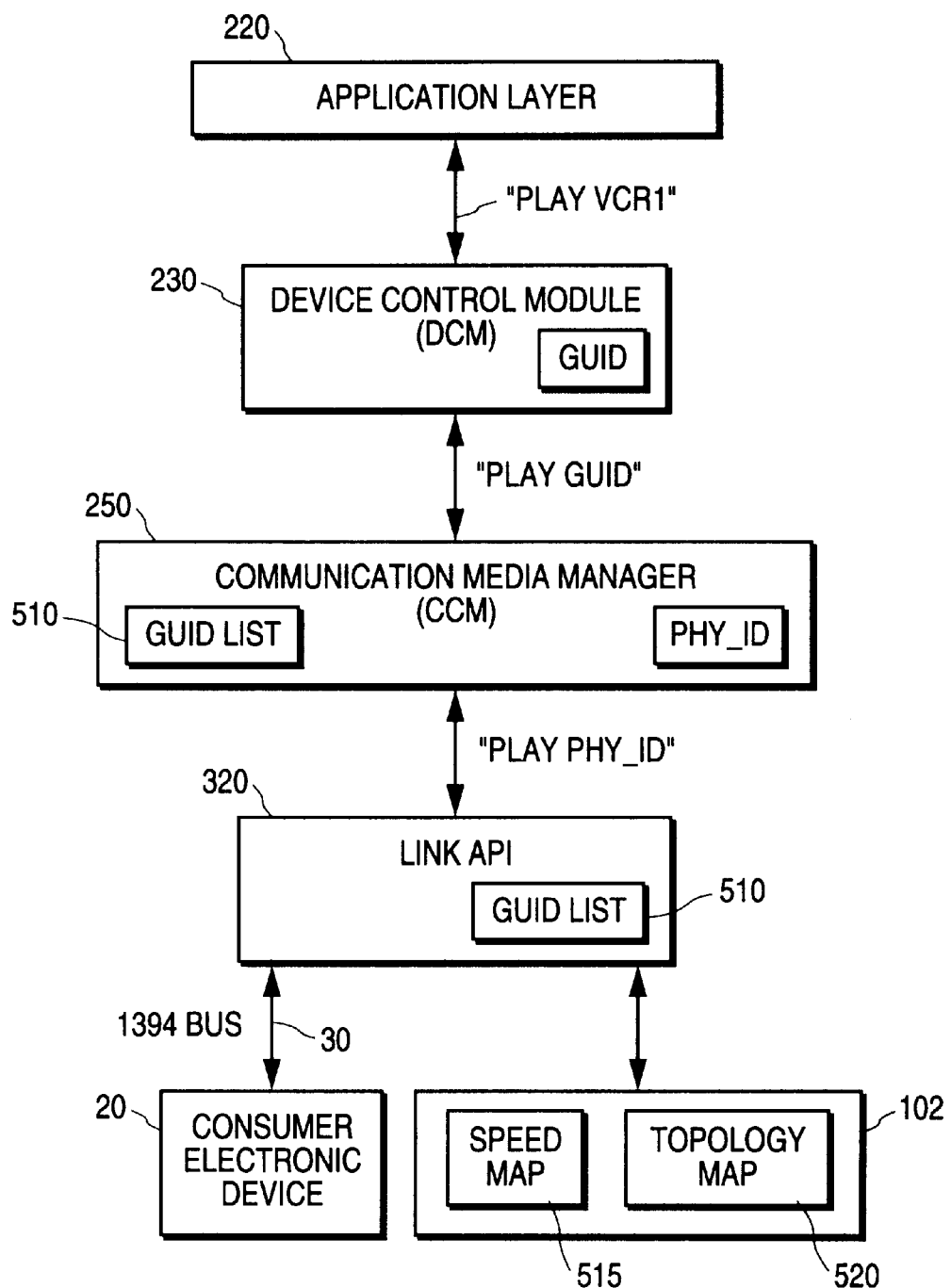
FIG. 8 illustrates communication pathways between an application, a device control module (DCM), the CMM and a link driver in accordance with the present invention.

FIG. 4 illustrates a data flow diagram 305a with the HAVI software architecture 200 including an interface with the local bus HAL layer 330 for local bus 30. In diagram 305a, the top layer is an application program layer ("application layer") 220 which can communicate with a function control module (FCM) layer 314 having AV/C command. The application layer 220 resides within a FAV and can also communicate with device control modules (DCMs) 230 and with the Registry 216. The application layer 220 communicates with a Stream Manager 335. The DCMs 230 are controlled by the DCM manager 270 which can communicate with the Event Manager 214. The Event Manager 214 communicates with the CMM 250. The Stream Manager 335 allows communication between the application layer and the CMM 250. The AV Messenger unit 212 also communicates with the CMM 250. The CMM 250 provides an interface with the local bus interface 330 via a link driver unit 320. The link driver unit 320 is responsible for compiling new GUID lists upon a local bus reset. Higher level applications are located with block 310 and lower level applications within block 312. A subset of this communication diagram 305a is illustrated in FIG. 8.

Figure 5A:
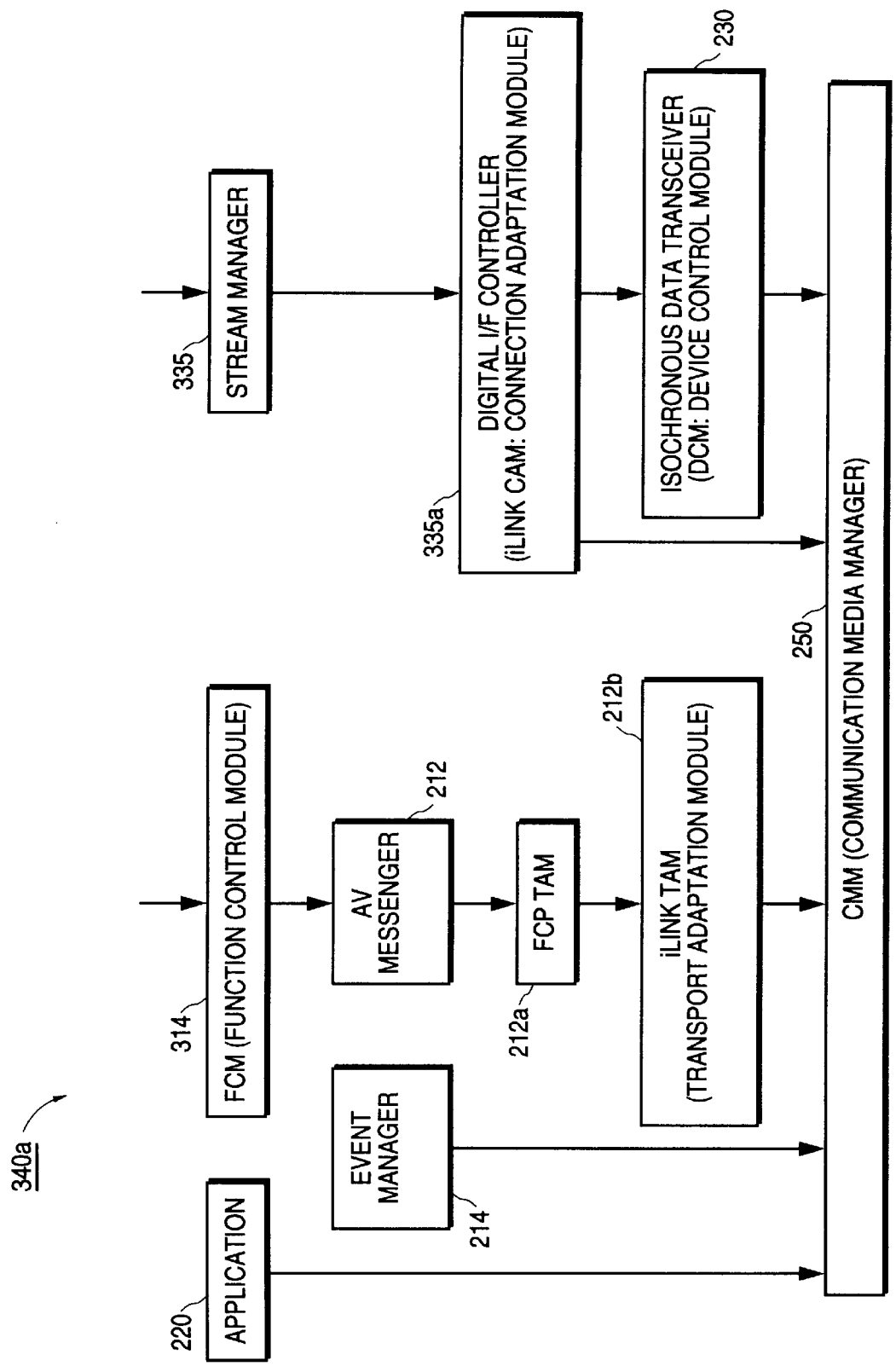
FIG. 5A illustrates communication flow to the communication media manager (CMM) of the present invention from various software objects.

FIG. 5A is a diagram 340a that illustrates communication channels that are available for communicating to the CMM 250. The application layer 220 communicates with the CMM 250 to obtain bus generation information, to obtain the GUID list, to obtain the speed map 515 and to obtain the topology map 520. The following APIs are used to perform these functions: getGUIDList( ); getBusGeneration( ); getSpeedMap( ); and getTopologyMap( ). The ilink transportation adaptation module, TAM, 212b communicates with the CMM 250 for asynchronous requests and asynchronous responses. The digital I/F controller 335a communicates with the CMM 250 for asynchronous requests, asynchronous responses, channel allocations, channel deallocations, bandwidth allocations and bandwidth deallocations. The Stream Manager 335 utilizes GUID information to establish point to point communications via the digital I/F controller 335a. The digital I/F controller 335a communicates with the CMM 250 using the following APIs: allocatechannel( ); deallocatechannel( ); allocateBandwidth( ); and deallocateBandwidth( ). The isochronous data transceiver 230 is a DCM and communicates with the CMM 250 using the following APIs: isoOpen( ); isoClose( ); isoAttach( ); isoDetach( ); and isoControl( ).

Figure 5B:
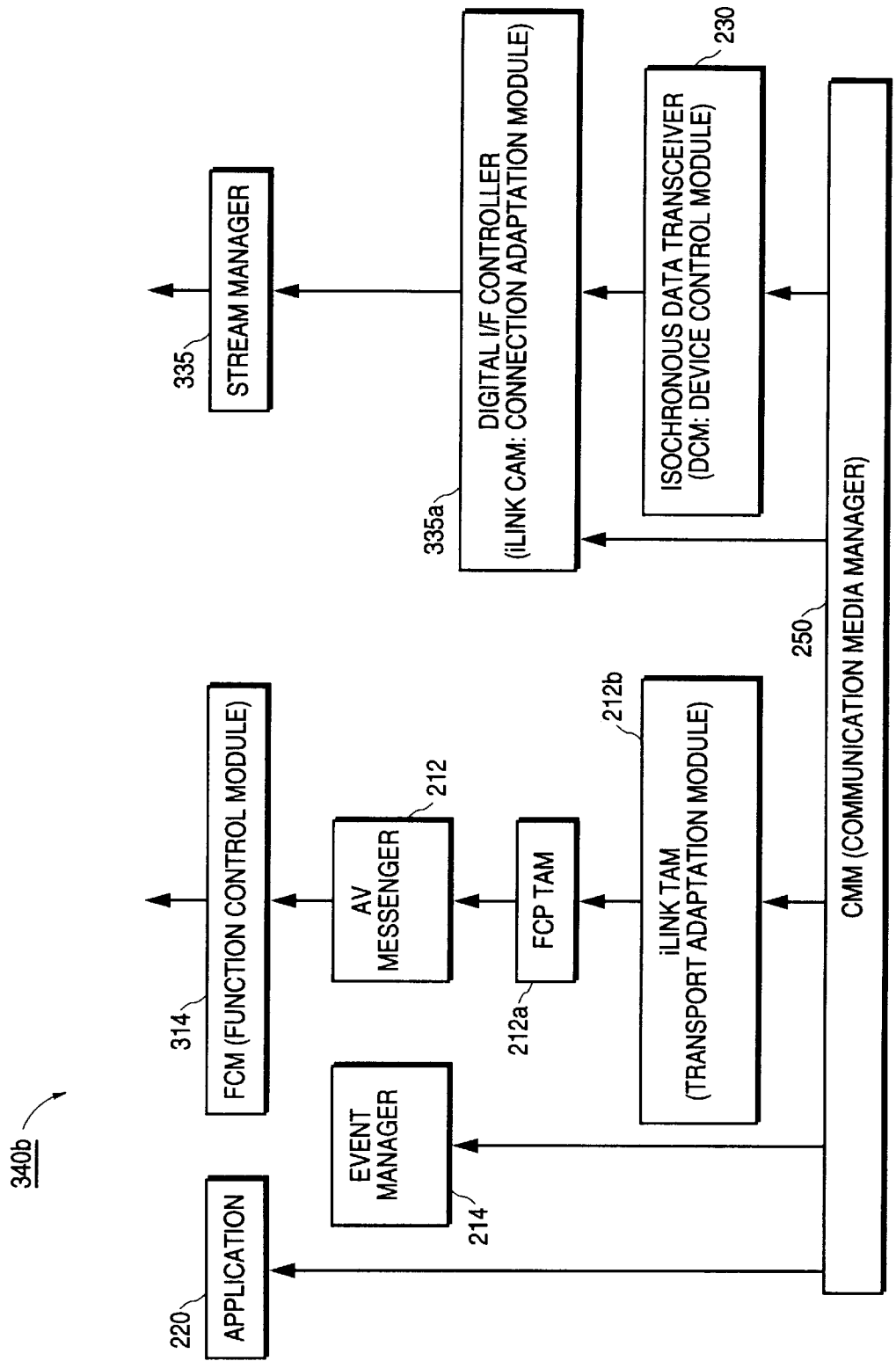
FIG. 5B illustrates communication flow to various software objects from the communication media manager (CMM) of the present invention.

FIG. 5B is a diagram 340b that illustrates communication channels that are available for communicating from the CMM 250 to other objects. The CMM 250 communicates bus reset indications to the Event Manager 214. The CMM 250 also communicates status information regarding the set of current devices on the local bus 30 including information as to which devices are added and which devices have been removed from the local bus 30 since the last GUID list was constructed. The CMM 250 also communicates bus reset information to the ilink TAM 212b as well as GUID information, asynchronous receive, and isochronous receive. This same information is also communicated from the CMM 250 to the isochronous data transceiver module 230. Information regarding which devices are coupled to the local bus 30 is also communicated from the CMM 250 to the digital I/F controller 335a.

Figure 6:
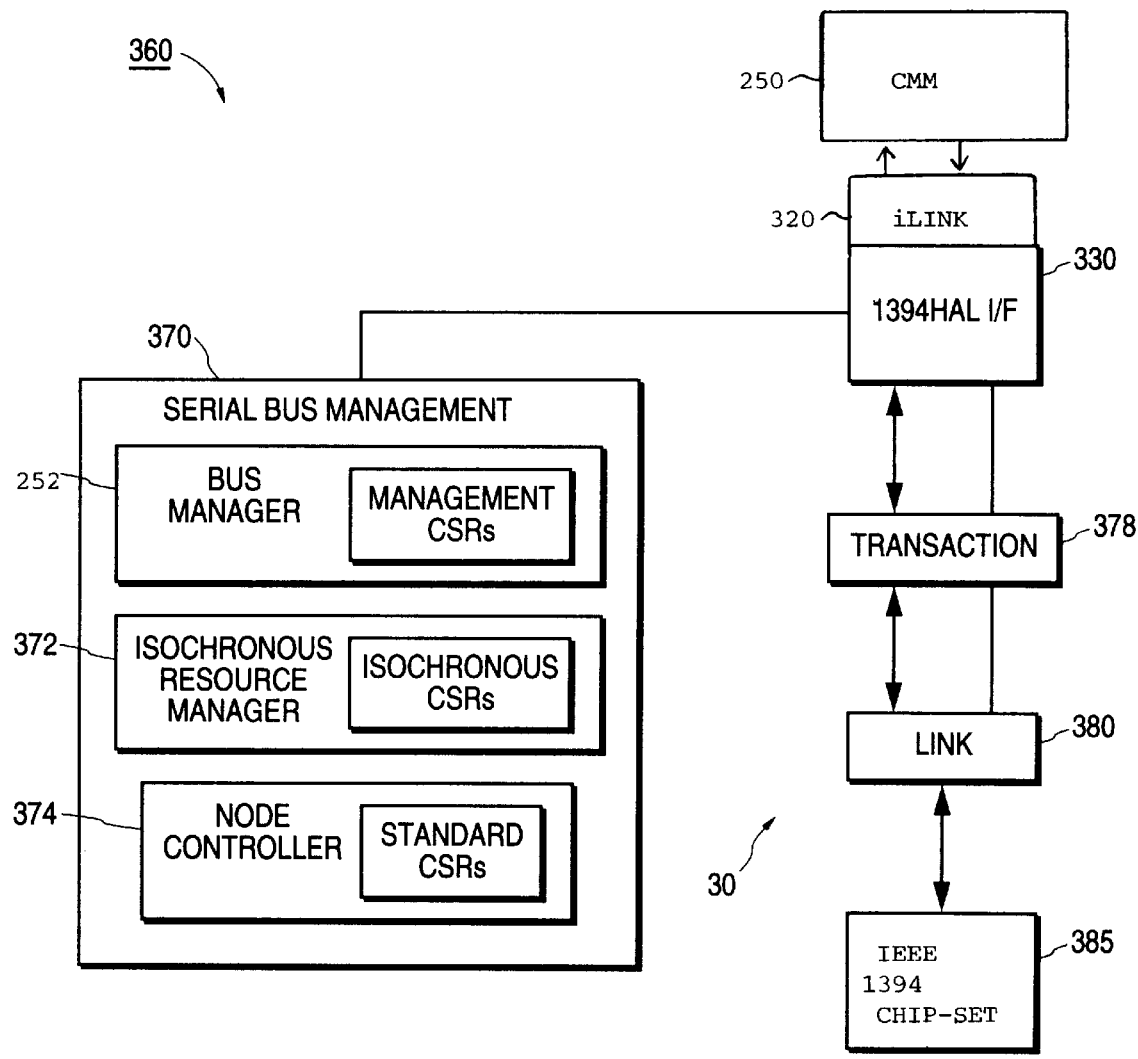
FIG. 6 illustrates the IEEE 1394 local bus interface (e.g., MPEG/MV Link) with CMM in the HAVI architecture.

FIG. 6 illustrates an exemplary interface 360 between the CMM 250 and the local bus 30 for IEEE 1394 interfacing. A 1394 Bus Manager 370 is also shown. The CMM 250 contains a copy of the speed map 515 and the topology map 520 (described further below) and and IEEE 1394 Bus Manager 370 contains control/status registers (CSRs). The isochronous resource manager 372 contains information regarding the bus master identification and the available channels and bandwidth for communication via isochronous registers (CSRs). The node controller 374 contains a configuration ROM as well as node control registers (CSRs). Units 250, 372 and 374 constitute the serial bus management unit 370. Unit 370 communicates with 1394 HAL interface (I/F) layer 330. The transaction block 378 processes read/write/lock transactions, tracks pending transactions and controls retry protocol operations with a busy/timeout register. Data transmission takes place within the link layer 380 and the I/F (CFR) unit 385.

DCM 230 AND DCM MANAGER 270

A description of the DCM 230 and the DCM manager 270 of FIG. 3, as well as other aspects of the HAVI software architecture 200 are described in copending U.S. patent application Ser. No. 09/003,119, entitled "A Home Audio/Video Network with Two Level Device Control", by R. Lea and A. Ludtke, filed concurrently herewith, attorney docket No. SONY-50L2278, assigned to the assignee of the present invention and hereby incorporated herein by reference.

THE COMMUNICATIONS MEDIA MANAGER 250

The CMM 250 (e.g., for the IEEE 1394 bus) of FIG. 4 provides two levels of APIs. One is the high-level API that interacts with other HAVI components to offer abstract services such as topology map 520 and speed map 515 as well as generating HAVI related events. The other level of APIs is the low-level API that provides a basic transport mechanism for both asynchronous and isochronous data transfers. Normally, high-level APIs are available to any HAVI entity or applications residing locally on this same node, while the low-level APIs presents the primary interface to the IEEE 1394 bus 30 so that specific protocols can be built on top of the CMM 250. To access high-level APIs, the HAVI message system (e.g., AvMessenger 212) is used, whereas access to low-level APIs can be accomplished through direct calls to the CMM 250.

The messaging used to access high-level APIs through HAVI message system is done using a format having a multi-byte selector followed by function dependent parameters. The function selector determines which service to use from the CMM 250, and the parameters section provides all required parameters for the specified function. To invoke low-level APIs, only the parameters section is necessary.

The IEEE local bus 30 is a dynamically configurable network. After each bus reset, a device can have a complete different physical identifier (phy_id) than it had before the bus reset. If a HAVI component or an application has been communicating with a device in the HAVI network it generally desires to continue the communication after a bus reset even though the device may have a different physical identifier. To identify a device uniquely regardless of frequent bus resets, the present invention provides the Global Unique ID (GUID) which is used by the CMM 250 and other HAVI entities. A GUID is a multi-bit number (e.g., 64-bits in one implementation) that is composed of 24 bits of node-vendor identification and 40 bits of chip (series) identification. While a device's physical identifier may change constantly, its GUID is permanent within the HAVI architecture. The CMM 250 of the present invention makes device GUID information available for its clients using a GUID list discussed further below.

The CMM 250 abstracts the underlying device interconnection mechanism, providing a common set of API's to describes the capabilities of the bus architecture. In one embodiment, the CMM concept is driven by the IEEE 1394 bus model, but is sufficiently abstract to provide a general service for interconnection management. The CMM 250 provides APIs for 4 four basic concepts. (1) Channel: a channel is a logical data connection that a bus can support. For technology such as IEEE 1394, this maps directly to hardware support for multiple channels. For technology that only supports a single data connection, then this degenerates to a single channel. (2) Bridge: a bridge is a connection between two bus technologies and allows channels to span different bus technologies. (3) Node: a node is a physical endpoint for a channel and corresponds to a unit or subunit in the HAV architecture. (4) Bandwidth: this is a metric of how much data can be carried on a bus at any one time. Bandwidth can be assigned to channels to support the required data rates for whatever data the channel is delivering.

For those bus protocols which do not support these concepts, the results of API calls to their CMMs have limited results For example, if a particular bus technology does not support multiple simultaneous data transfer actions, then it most likely reports only a single "channel," even though it does not really support channels. The CMM 250 maps transactions to the channel model.

There is one CMM 250 for each physical interface (e.g. 1394, Control A1, TCP/IP) on a FAV node. Because there can be more than one kind of CMM 250, and because there can be many of them in existence, each CMM 250 has a module_type attribute attached to its entry in the Service Registry 216 database. The definition of this attribute can be as follows:

module_type=busManager
module_data={1394, Control A1, TCP/IP, etc.} These bus types will have numeric identifiers defined for them.

Each CMM 250 contains the general set of API's for bus management, as well as protocol-specific API's. If a particular bus technology supports features that are above and beyond the general model, then it can subclass the CMM base class and add the new functionality. For example, the 1394 CMM 250 allows access to the 1394-specific bus attributes such as the isochronous resource manager. Those clients who are 1394-aware, and need such capabilities, can go through the 1394 CMM 250.

Figure 12A:
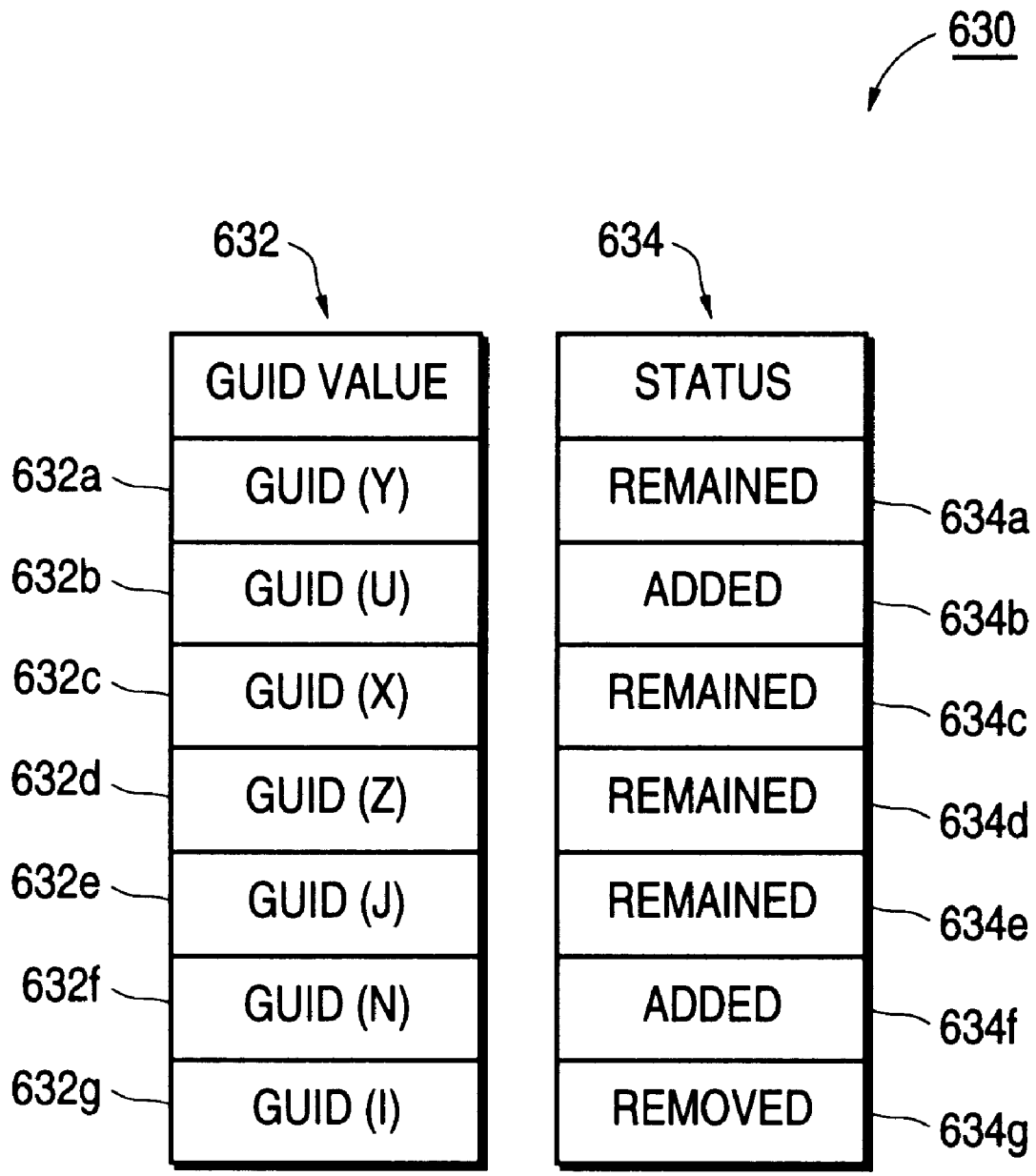
FIG. 12A illustrates a general GUID update status list constructed by a second embodiment of the present invention in response to the device network configurations of FIG. 10A and FIG. 10B.
Figure 12B:
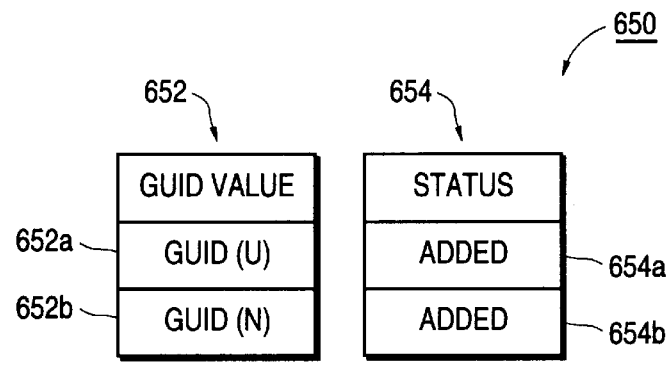
FIG. 12B illustrates an "added" GUID update status list constructed by a second embodiment of the present invention in response to the device network configurations of FIG. 10A and FIG. 10B.
Figure 12C:
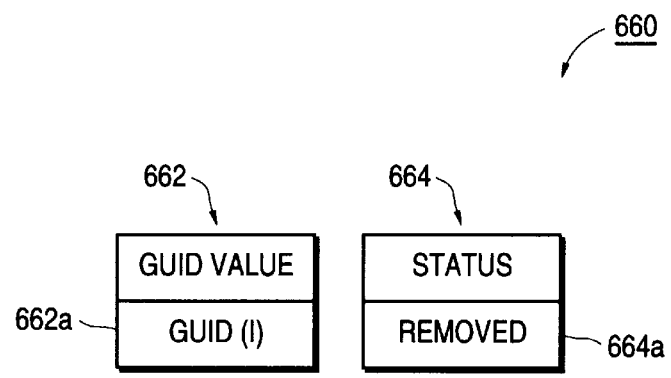
FIG. 12C illustrates a "removed" GUID update status list constructed by a second embodiment of the present invention in response to the device network configurations of FIG. 10A and FIG. 10B.

One of the advanced features the 1394 bus provides to the HAVI architecture is its support for dynamic device actions such as hot plugging (device insertion or power up) and unplugging (device removal or power down). To fully support this to the user level, high level software clients need to be aware of these environment changes and the present invention provides this information. The CMM 250 works with the Event Manager 214 to detect and announce these dynamic bus changes using device status tables (FIG. 12A, FIG. 12B, FIG. 12C). Since any topology change within 1394 bus will cause a bus reset to occur, the CMM 250 is informed of these changes and notifies the Event Manager 214 of these changes along with the information about devices that have disappeared as well as those that have become available. The Event Manager 214 then distributes the related event to all interested HAVI entities or applications that previously established the proper call back handlers.

There are two basic types of events that are generated from the CMM 250 to support dynamic updating of available devices in the network. One is NEW_DEVICE which indicates a new device, and the other is GONE_DEVICE, indicating a device has been removed. To increase efficiency, the CMM 250 generates device status tables with this information. Whenever a device is added or removed from the network, a bus reset is generated and CMM 250 finds and passes a status table of new/gone devices o the Event Manager 214 if the Event Manager 214 has requested such service. Since NEW_DEVICE or GONE_DEVICE also indicates the occurrence of a bus reset, the Event Manager 214 may also create a BUS_RESET event based on the above information. It should be noted that all these events are generally "local," which means that the Event Manager 214 does not generally send/broadcast such events to any other nodes.

The CMM 250 also provides topology, speed maps, and other environment descriptions to its clients. The topology map 520 (FIG. 9A) depicts the connectivity among physical devices. Within the present invention, it can be used to build a human interface that helps the user understand how devices are connected and how certain features may be used. The speed map 515 (FIG. 9B, FIG. 9C) provides information on the possible maximum speed that can be used for data transmission between any two devices in the network. Speed maps provide information about the connectivity and performance of sections of the HAV network. It can be used to analyze the current connection scheme and give the user helpful suggestions for improving the performance of devices by rearranging the connections. If attributes such as the topology map 520 cannot be automatically generated, then a dialog with the user may be required. When a topology request is made to a CMM for a protocol that does not support automatic topology detection, the request can trigger such a dialog. After interacting with the user to determine how its devices are connected, the CMM returns the requested information.

Topology map 520 and speed map 515 may change constantly because their organization (e.g., data order) is based on the physical identifiers of the devices on the network and these values can become reassigned due to the allowed dynamic insertion or removal of devices. To identify the right "version" for these maps, a bus generation number may be used. Newer bus generation values signify the change of bus configuration. It may also be used to check if a pending operation is "stale". Since transactions between devices require the existence of those devices, it is possible that a pending transaction has not yet completed and one or more devices involved have gone away. When this happens, a new bus generation number will be generated and the related process can check against this new generation number to make proper clean up for the stale transaction.

Bus generation number, topology map 520, and speed map 515 remain unchanged between bus resets. To improve efficiency, the CMM 250 may optionally cache them internally and keep them updated only when bus reset occurs.

Another feature of the IEEE 1394 bus 30 is its capability to send timing-critical stream through its isochronous channels. To send data in isochronous mode, channel number and proper bandwidth need to be allocated from the bus. The CMM 250 provides such services to allocate/deallocate channel numbers and bandwidth for its clients. It is also responsible to restore these resources for its clients right after each bus reset so that any existing isochronous data transaction will not be disrupted because of the unavailability of these resources.

The CMM 250 also provides a transport mechanism to actually transfer the data, which is part of low-level services. There are two types of data transactions with IEEE 1394 bus 30. One is asynchronous, the other isochronous. Typical asynchronous transfer includes quadlet/block write, quadlet/block read, and lock operations. Typical isochronous data transfer normally involves allocating channel/bandwidth, opening isochronous data port, attaching data buffer(s), and activating data transfer. These services provide a fundamental transport mechanism for a 1394 based HAVI system being functional.

The following APIs are provided by IEEE 1394 specific CMM 250 within the present invention:

1) CMM::enrollComeNGo( )
Status: enrollComeNGo(ObjectID oid, (void *) (*) callback_handler)
This command is used by the Event Manager 214 to get a list of new and removed devices when bus reset occurs. The Event Manager 214 enrolls such request to the CMM 250 to get the service. The parameter oid is the caller's object identifier and callback_handler is the callback function provided by the caller. The caller (typically Event Manager 214) enrolls its OID and a callback handler to the CMM 250 so that when bus reset occurs, the CMM 250 invokes the callback function with a list of devices (device status table) that are either new or gone.

2) CMM::getGUIDList( )
Status: CMM 250::getGUIDList(GUID *guid)
This command gets the GUID for all active devices in the network. The parameter guid is a pointer to a the GUID list.

3) CMM::getBusGeneration( )
Status: CMM::getBusGeneration(uint32 *bus_en_number)
This command gets the current local bus generation number from the network. The parameter bus_en_number is the current bus generation number.

4) CMM::getSpeedMap( )
Status: CMM::getspeedMap(uint32 bus_en_number u_char*spd_map)
This command gets the speed map 515 which is associated with the bus generation number specified. The parameter bus_en_number is the current bus generation number, spd_map is a pointer to the speed map 515

5) CMM::getTopologyMap( )
Status: CMM::getTopologyMap(uint32 bus_en_number, uint32*top_map)
This command gets the topology map 520 that is associated with the bus generation number specified. The parameter bus_en_number is the current bus generation number and top_map is a pointer to an array of integer numbers, each representing a selLID packet from a 1394 node.

6) CMM::allocatechannel( )
Status: CMM:: allocateChannel(uint32 chan_no)
This command allocates a channel specified by chan_no. If chan_no is all ones (Ox FFFFffff), any channel available will be allocated and returned. The parameter chan_no is a channel number to be allocated.

7) CMM::deallocatechannel( )
Status: CMM::deallocateChannel(uint32 chan_no)
This command deallocates a channel specified by chan_no. The parameter chan_no is the channel number to be deallocated.

8) CMM::allocateBandwidth( )
Status: CMM:: allocateBandwidth(uint32 bandwidth)
This command allocates the bandwidth specified by bandwidth. The parameter bandwidth is the bandwidth to be allocated.

9) CMM::deallocateBandwidth( )
Status: CMM::deallocateBandwidth(uint32 bandwidth)
This command deallocates the bandwidth specified by bandwidth. The parameter bandwidth is the bandwidth to be deallocated.

10) CMM::asyncWrite( )
Status: CMM::asyncWrite(GUID guid, u_int64 remote_offset, u_char*data, uint32 data size, uint32 pk_format)
This command sends an asynchronous write request to the remote device, which is identified by guid. The parameter guid is the target device's GUID, remote_offset is the target device's memory offset, data is a pointer to data to be sent, data_size is the size of data (in byte) to be sent and pk_format is the format to use, either quadlet or block for data transfer.

11) CMM::asyncRead( )
Status: CMM::asyncRead(GUID guid, u_int64 remote_offset, u_char*data, uint32 data_size, uint32pk_format)
This command sends a asynchronous read request to the remote device, and returns the data read back. The parameter guid is the target device's GUID, remote_offset is the target device's memory offset, data is the pointer to data to be received, data_size is the size of data (in byte) to readback from remote site, and pk_format is the format to use, either quadlet or block for data transfer.

12) CMM::asyncLock( )
Status: CMM::asynclock(GUID guid, u_int64 remote_offset, u_char*old_data u_char*new_data, uint32 data_size uint32 exLcode)
This command makes a lock operation on the specified address in the remote device. The parameter old_data is used for compare and swap operation. The parameter guid is the target device's GUID, remote_offset is the target device's memory offset, old_data is the pointer to old data, new_data is the pointer to the new data, data_size is the size of data (in byte) to be sent, and ext_code is the extended code to be used for the lock operation 13) CMM::isoOpen( )
Status: CMM::isoOpen(uint32 direction, uint32 bus_speed, uint32 bandwidth, uint32*port-no)
This command opens an isochronous port or either sending or receiving operation. The actual port opened is returned in port_no. The parameter direction is the sending or receiving operation, bus_speed is the requested bus speed, bandwidth is the maximum bandwidth to be used, and porLno is the port number successfully opened 14) CMM::isoClose( )
Status: CMM::isoClose(uint32 port-no)
This command closes the port specificed. The parameter port_no is the port number to be closed Close the port specified.

15) CMM::isoAttach( )
Status: CMM::iosAttach(uint32 porLno, u_char*buffer)
This command attaches a user buffer to the specified port. The parameter porLno is the port number to be used and buffer is the data buffer.
16) CMM::isoDetach( )
Status: CMM::iosDetach(uint32 port-no, u_char*buffer)
This command detaches a user buffer from the specificed port. The parameter port_no is the port number to be used and buffer is the data buffer.
17) CMM::isoControl( )
Status: CMM::isoControl(uint32 chan, uint32 trigger)
This command controls the actual data transfer. It starts immediately or on some synchronization bit. The parameter chan is the channel to be used for the transfer and trigger is the method to use to start the traffic.

In addition to the basic four abstractions discussed above (Node, Channel, Bridge and Bandwidth), the following concepts describe the bus model. The topology map 520 is a connected graph which mirrors the physical connections between nodes on the network. For IEEE 1394, the map is generated automatically. For other protocols, manual assistance from the user may be required. The overall system topology is an amalgamation of individual bus topologies. The generation number provides a way to measure whether a pending operation is "stale." Since transactions between devices depend on being able to access those devices, it is possible that a pending transaction has not yet completed and one or more of the devices involved have gone away. When this happens, any modules that care about the bus generation react accordingly.

The generation value is based on the ability to determine that the bus configuration has changed. For protocols such as IEEE 1394, the generation is critical because of hot plugging support. For others, if hot plugging support can be simulated, then the generation number can be managed as well. If no hot plugging support can be created, then the generation number will always default to "1," meaning that the bus has not changed since the host system was initialized. A bus can allow a certain maximum number of nodes (devices) to be connected and individually addressable at any given time. At any given time, the CMM 250 is informed of how many devices are currently attached and addressable (number of nodes)

As described more fully below, the C MM 250 provides bus reset or change notification for buses that support dynamic connection. After a bus reset is detected, this module assigns new "opaque" ID values to all devices that have just appeared, determines what devices have gone away, invokes the DCM Manager 270 module to create new DCMs, and posts a bus_change notification event to the Event Manager 214, which notifies all registered clients about the reset. In accordance with the present invention, it also provides enough information for the clients to determine what devices have disappeared and about any newly discovered devices. The CMM 250 works with the Event Manager 214 to detect and announce dynamic bus chances that do not trigger system-wide interrupts or events, thus bringing some of the advantages of 1394 technology to other bus protocols.

The CMM 250 provides clients with the physical topology map 520, in a manner that does not require clients to have bus-specific knowledge. The topology map 520 can be generated automatically for those control protocols which support it, or can be generated with user interaction and stored for later use for those protocols that do not support automatic generation. Because topologies can be quite diverse, the CMM 250 provides a topology iterator function similar to that of the Service Registry 216. This function allows clients to visit each node in a connection-specific manner, with a simple API to move forward or backward through the net. The client can determine simply that this device is connected to that one, which is connected to that one, etc. For clients who simply need to know about all devices in a topology, with no concern for connection patterns, the GUID list is provided. Other API's allow the query to determine if a given moduleID (the identification of a DCM which represents a physical device) is represented in the topology, etc.

The CMM 250 also provides logical connection information. This is a connection model that specifies data flow sources and sinks. The API allows inquiries such as "given DCM module ID X, tell caller all of the DCMs that are listening to it." Other variations on this inquiry model include the ability to ask for all currently active streams of a particular data type (e.g. MPEG, SD), etc.

EVENT MANAGER 214

The Event Manager 214 of FIG. 4 is designed to support a one-to-many model of communication. It is built above the basic messaging system 212. Objects register interest in events which are then delivered to their event call back entry. For instance, objects interested in device status information register special call back handlers for this information with the Event Manager 214. Objects can attach event filters to the callback entries that allow them to filter out events that they are not currently interested in. For example an object may register for all events from display devices, but filter out those display devices it is not currently using.

Events are broadcasted by the messaging system 212 and delivered to all objects that have registered an interest in the event. To achieve this, objects register their interest with their local Event Manager 214. The messaging system delivers events to all known Event Managers 214 which are then responsible for ensuring that registered objects are informed about events. Filters can be attached to Event Managers 214 to allow objects to filter out the events as they arrive. This gives an object the flexibility to register interest in an event, but have control over how each event is used. For example a filter could be used to specify that event X is only of interest if it occurs after event Y. The Event Manager 214 tracks filters and provides an API that allows applications and DCMs to build sophisticated event filtering chains.

STREAM MANAGER 335

The Stream Manager 335 of FIG. 4 provides an API for configuring end-to-end isochronous ("streaming") connections. Connections may be point-to-point or utilize unbound sources or sinks. The responsibilities of the Stream Manager 335 include: configuration of connections; requesting allocation of network resources; maintenance of global connection information; and support of high-level stream operations such as plug type checking, splicing and bridging.

A Stream Manager 335 runs on each FAV node. The interface is based on the IEEE 1212 unit directory model and the IEC 6 1883-FDIS plug model (HAVI refers to units and subunits as devices and functional components respectively). Point-to-point connections and broadcast connections are supported. In IEEE 1394, a broadcast connection is one in which either the source or sink is not specified when the connection is requested. Streams do not cross transport boundaries, but bridge devices can be used to feed one stream into another. Streams originate and terminate at functional components (rather than devices). For IEEE 1394 networks, the Stream Manager 335 is responsible for allocating PCRs (plug control registers) and requesting bus bandwidth. A standard naming scheme is used for stream types, transport types and transmission formats. The stream type and transport type naming schemes are specified by HAVI, transmission formats are the FMT/FDF values used in IEC 1883 Common Isochronous Packets.

A stream type identifies a media representation, this can be a data format (for digital media) or signal format (for analog media), e.g. CD audio, NTSC. A transport type identifies a transport system, two examples are IEC 1883 (for connections running over 1394) and "internal" (for connections internal to a device). A transmission format identifies the data transmission protocol used to send a stream type over a transport type. For IEC 1883, the transmission format corresponds to the FMT and FDF fields in the Common Isochronous Packet (CIP) header.

A stream as used by the Stream Manager 335 is based on the isochronous data flow model from IEC 1883 with three differences. The first difference is that streams do not restrict the number of sources and so can have multiple sources provided the transport supports this form of connectivity, for example, a UDP "event" stream being fed by many processes. The second difference is that an IEEE 1394 data flow starts at a device output plug and ends at a device input plug, while a stream typically starts at a functional component output plug, goes to a device output plug, then a device input plug, and ends at a functional component input plug. The final difference is that streams are typed, e.g., for each stream there is an associated stream type identifying the data.

The following summarizes the properties of streams: 1) a stream is associated with a globally unique stream identifier; 2) a stream is carried over a single channel; 3) output functional component plugs ("plugs") and input plugs can join a stream (this can also be stated as "connect to the channel"); 4) a channel can be connected to zero or more output plugs and zero or more input plugs; 5) an input plug can join at most one stream; 6) an output plug can join many streams (for example a functional component output plug attached to several device output plugs); 7) a stream can be created with no output plug, but no data will flow over the stream until an output plug has joined; and 8) the upper limit on the number of plugs that can be connected to a channel is transport type dependent.

A stream can be viewed as a set of plugs. The following rules apply to connections within a device. Functional component input plugs can have only one connection (from a functional component output plug or a device input plug). Functional component output plugs can have many connections (to functional component input plugs and/or device output plugs). Device output plugs can have only one connection from a functional component output plug. Device input plugs can have many connections to functional component input plugs.

There are three procedures for adding or removing plugs from this set: 1) point-to-point procedure (Connect, Disconnect); 2) broadcast-out procedure (StartBroadcast, StopBroadcast); and 3) broadcast-in procedure (Tap, Untap). Connect creates a point-to-point connection between two plugs (e.g., a connection from an output plug to the channel and a connection from the channel to the input plug); it adds an output plug and an input plug to the stream (assuming neither are already members). StartBroadcast creates a "broadcast-out" connection (e.g., a connection from an output plug to the channel); it adds an output plug to the stream (assuming it is not already a member). Tap creates a "broadcast-in" connection (e.g., a connection from the channel to an input plug); it adds an input plug to the stream (assuming it is not already a member). Disconnect, StopBroadcast and Untap drop) the connections created by Connect, StartBroadcast, and Tap respectively. They remove plugs (if not used by other connections within the stream).

Streams allow the overlaying of connections as described in IEC-1883, e.g., a plug may have many connections (both point-to-point and broadcast) to the channel used by the stream. Following the connection semantics of IEC-1883, the Stream Manager 335 decides when to remove a plug from a stream by examining the plug's point-to-point connection counter and a broadcast flag (which indicates whether or not the plug participates in a broadcast connection). A plug is removed from a stream when the point-to-point connection is 0 and the broadcast flag is false. The underlying network resources used for a stream are allocated when the first plug is added to the stream and released when the last plug is removed. In the case of a channel (connected to several output plugs, the manner in which the resulting data flow is delivered is transport type dependent and the Stream Manager 335 does not guarantee that all input plugs will receive data in the same order.

The Stream Manager 335 maintains a map of all stream connections within the home network. This map includes internal connections (those within devices) and external connections (those over transport systems). The Stream Manager 335 builds the Global Connection Map upon initialization, after bus reset, and periodically while running (in case new connections have been added or removed by non-HAVI applications).

An AV network can take on many topological configurations, depending on how the user has made the connections between devices. For example, an IEEE 1394 bus allows any topology except a loop. The Stream manager 335 of FIG. 3 works with the CMM 250 to provide services to assist with routing data from source to destination. This can include many nodes in between. In the event that the source and destination involve different data types, or are separated by a "data type barrier," it will work with a data format manager and Service Registry 216 to handle automatic or requested data translation services as well. Some routing can be performed automatically, based on the capabilities provided by the underlying bus architecture. For example, the topology of the IEEE 1394 bus can be precisely determined, and therefore automatic routing between directly-connected 1394 devices can be achieved. However, other connection mechanisms can require interaction with the user, either to assist the user with making well-known connections or to have the user indicate to the controlling software how devices are connected.

One of the most significant attributes of the IEEE 1394 technology is isochronous data flow. Additional services provided by the Stream manager 335 for this kind of data include buffer allocation and management. Buffer management includes the provision of a consistent notification mechanism to let the client know when data is available, so that it can be processed. While isochronous data is flowing into a client, various memory buffers will be filled with that data. As each buffer is filled, the client may want to know so that it can handle the data acquisition process from that point forward.

In addition, buffer management can be simplified for clients by having the appropriate service modules partition memory in a manner that is optimized for the data being captured. For example, the client can allocate one large space of memory, then specify that it will be used for capturing a stream of video data. It is possible that the optimum configuration of this memory is to separate it into scan line- or frame-sized segments, so the client can receive one complete line or frame of video on each notification. Raw audio and MIDI data will likely have different optimum segment sizes. Such services require close cooperation between the Route and Data Format Managers, and various service modules.

Figure 7A:
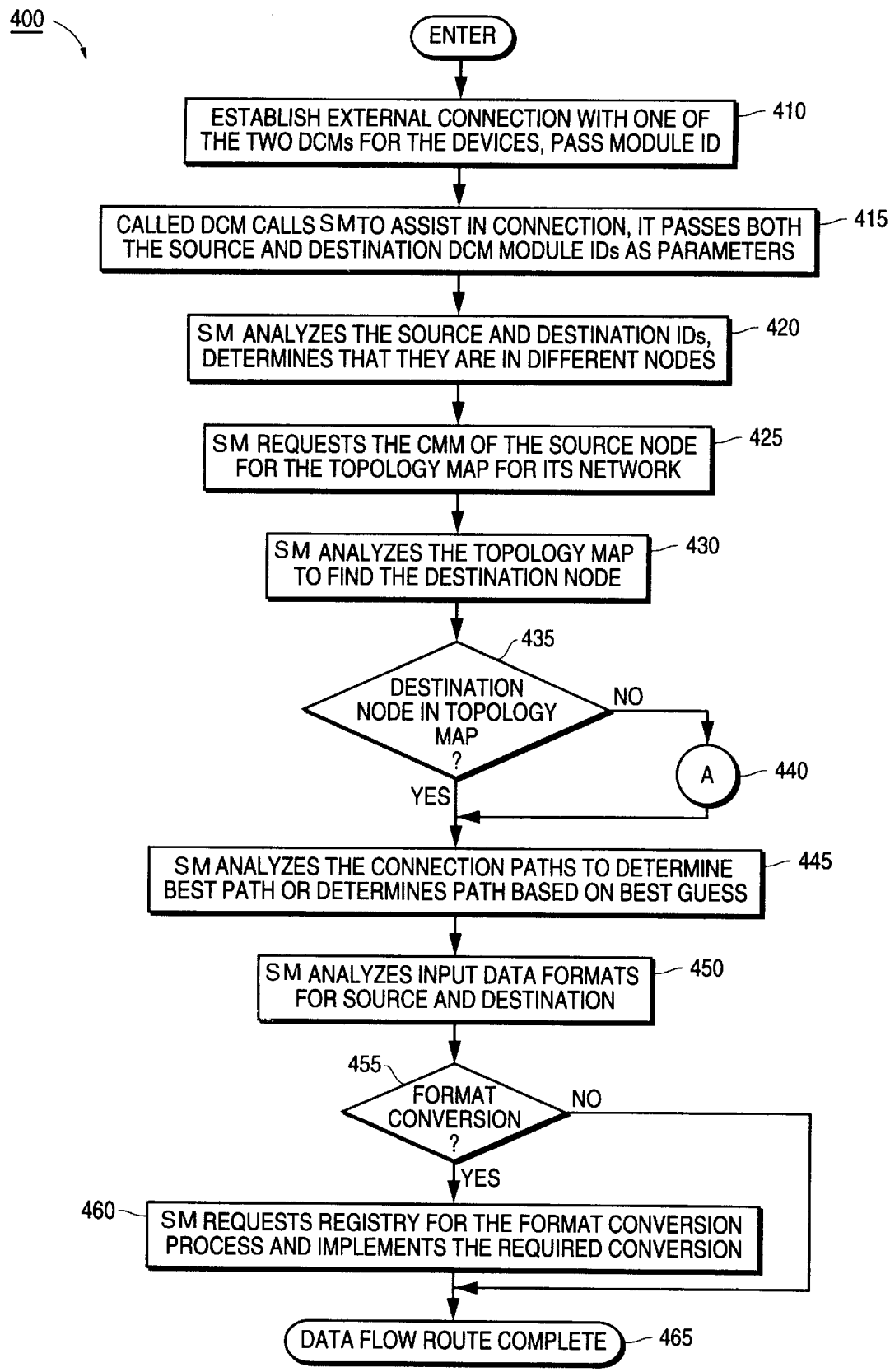
FIG. 7A and FIG. 7B illustrates steps performed within the HAVI architecture to implement message communication between devices.
Figure 7B:
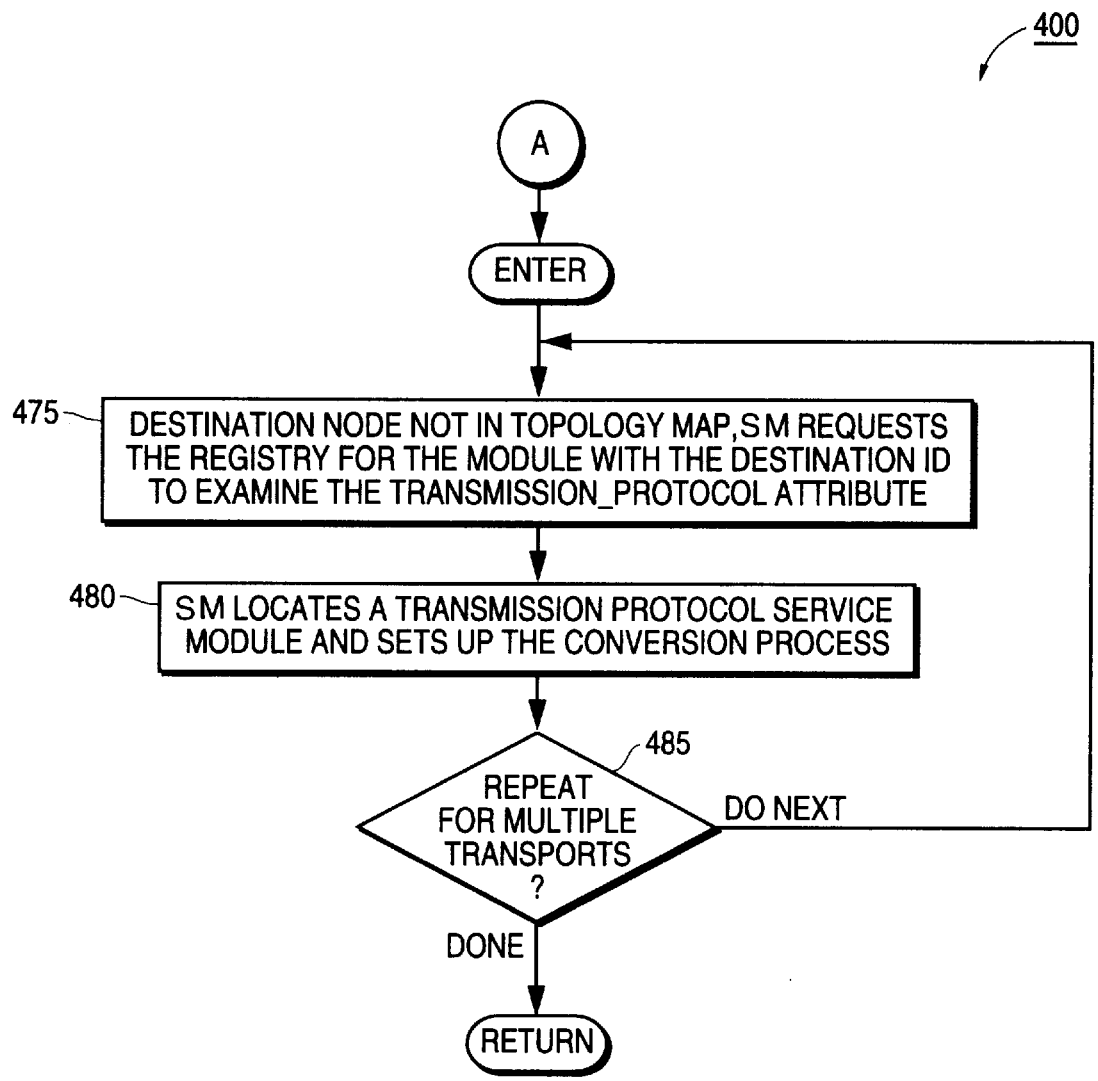

Refer to FIG. 7A and FIG. 7B where an example process 400 is shown for setting up a data flow. A client wants to establish a connection between two devices, so at step 410 it calls to establish in external connection of one of the two DCMs that represent those devices. It passes the moduleID of the other device's DCM as a parameter. At step 415, the DCM that was called then calls the Stream Manager (SM) 335 to assist with making the connection. It passes both the source and destination DCM module IDs as parameters. At step 420, the SM 335 analyzes the source and destination IDs, finds that they are in different nodes (this step may be carried out by some other entity before invoking the DFM). At step 425, the SM 335 asks the CMM 250 of the source node for the topology map 520 for its network. At step 430, the SM 335 analyzes the topology map 520 to find the destination node.

At step 435 of FIG. 7A, if the destination node is on the topology map 520, then no transport protocol translation is necessary and step 445 is entered directly. If the destination node is not on the map, then at step 475 (FIG. 7B) the SM 335 asks the Registry 216 for the module with the destinationID, to look at the "transmission_protocol" attribute, or alternatively, it gets the bus manager ID for that module/node. At step 480, the SM 335 then finds a transmission protocol service module, and sets up the conversion process (see separate example for these details). At step 485, the above process is repeated if multiple transports need to be bridged.

At step 445 of FIG. 7A, the SM 335 analyzes the connection paths to find the best route. If no deterministically optimal path can be determined, then a best guess is accepted. This is done for the entire path from source to destination, including intermediate or cross-network boundaries. All necessary connections are made (in the case of dynamic buses such as 1394). At step 450, the SM 335 analyzes the input data formats for source and destination. At step 455, if the formats are the same, then no format conversion is necessary. At this point (465) the data flow route 400 is complete.

If conversion is necessary, then at step 460, the SM 335 asks the Registry 216 for the appropriate format converter based on input and output format and sets up the conversion process. Note that several converters can be chained together to achieve the final result from original source to desired destination formats. The data flow route 400 is then complete.

SERVICE REGISTRY 216

The Service Registry 216 of FIG. 4 provides a mechanism to locate devices and services that are available in the HAV network. Since all devices and services are represented by objects, the Service Registry 216 allows any object to advertise itself. Typically, resident on an FAV, the Service Registry 16 contains information on local service objects, remote service objects and local and remote devices. The Service Registry 216 operates by providing an API that allows objects to register their unique identifier, a name, and a set of attributes that define their characteristics including connection point information. Any object wishing to locate a particular service or device object can do so by querying the Service Registry 216 for the appropriate DCM.

Attributes associated with an object may be static or dynamic, and can be subsequently changed if desired. Attribute querying is carried out by specifying a set of required attributes which then returns a list of objects that match the required attributes. Identifiers returned as a result of a query are not guaranteed to be valid. This can happen in one of two ways. First, if a device has posted its availability into the registry and then has gone off-line. If the query arrives between the time of going off-line and actually withdrawing the service from the registry, then the identifier will be stale. Second, if a query returns a set of identifiers, the results may be held within an object for an extended period of time. When they are finally used, it may be that the service has been withdrawn from the registry.

The Service Registry 216 is a distributed service. Any object that registers with its local Service Registry will be accessible via any other instances of the Service Registry 216 in the HAV network. Each Service Registry 216 works with others to ensure that entries are replicated or available when required. However, for both performance and resource reasons, it is often the case that an item registered in one registry will not be visible in another, although the system will try to ensure this. This implies that a simple query to a local Service Registry 216 may return the local registry's view of the global state. It will always be possible to cause a remote query to be carried out on behalf of the query to ensure that the global state of the system is queried explicitly.

Queries to the Service Registry 216 return object identifiers usable as end point for message communication. These identifiers may refer to DCMs, services, or any other entity in the system accessible via the messaging system. The format of the queries allows both sophisticated queries that iterate over the global registry or simple queries that are confined to a local registry.

MESSAGING 212

The messaging system 212 of FIG. 3 is designed to provide a reliable high level messaging service that supports the transport of 4 different types of messages. (1) Commands: these flow between objects in the system and are used to access functionality. When the target object is a device then these messages are sent by a DCM and contain actual device control messages. (2) Events: events are used as a general purpose asynchronous communication mechanism that allows both devices and service modules to communicate information. Although the messaging system 212 is used to carry these events they are under the control of the Event Manager 214 which uses a broadcast feature of the communications infrastructure to send events to those who are interested. (3) Errors: errors are similar to events except errors are delivered to the source of the command that caused the error and then broadcast. (4) Status: these messages are designed to be used in response to a query.

The message system 212 provides both a synchronous and an asynchronous send allowing services to operate in either mode. The messaging system 212 defines a minimum capability to allow interoperability at the message level. This includes the format of identifiers, the format of message identifiers and the format of messages.

The following illustrates an exemplary implementation. Local identifiers are 56 bit and are guaranteed to be unique to a particular host. Network identifiers are 128 bits and consists of a 64 bit node identifier, an 8 bit node type and the 56 bit local identifier. The generic format for remote messages is a 4 octet type field followed by a parameter block. This is referred to as the message payload. The mechanism to support local messaging is implementation dependent and what is required is that local identifiers guarantee consistent delivery of the message payload. Remote messaging takes a message payload and encapsulates it in a network message. The network message format is header plus message payload. The network message header is 96 bits and consists of a reserved 6 bit field, a 2 bit packet type, a 56 bit local identifier and a 32 bit message identifier. Depending on the actual transport mechanism, this remote message packet will be encapsulated in a transport specific message, e.g. IP or IEEE 1394.

INITIALIZATION MANAGER 210

The Initialization Manager 210 of FIG. 3 is used to bring an IAV or FAV node up to initial status. In the case of an IAV node this manager 210 will initialize the messaging 212, event 214 and registry 216 service. For the FAV node it will also invoke initialization routines for the DCM manager 270 and any pre-loaded services.

APPLICATION INTERFACE 220

The Application Interface 220 of FIG. 4 is a proxy to the messaging system 212 and provides a means for applications to access services and devices in the AV architecture. The Application Interface 220 is not necessarily a component of the AV architecture, but rather a means of allowing an arbitrary application to work with the AV architecture The mechanism used to provide the application object depends on the location of the application and the execution environment it uses. Applications can be downloaded from external services provided and made resident (e.g., instantiated) within an intelligent device (FAV) of a HAVI network. An Application so downloaded can query the Service Registry 216 to determine connection points for controlling devices of the HAVI network.

There are 3 general cases. The first case is local application running native on the FAV node. These types of applications are designed to make use of the native OS and hardware features of the FAV node. They are created externally to the AV architecture and use the application interface to gain access to the AV architecture services. The exact means to achieve this are system dependent, but a library linked into the application is a typical approach.

The second case is local application running above the FAV interoperability language run-time. In this case, the AV architecture uses an architecture neutral run time to support level 2 interoperability. This run time can also be used to support arbitrary applications written to be hosted on the run time. Such applications are managed by the AV architecture and will typically access the AV services via a run time supplied calling mechanisms.

The third case is remote application. These applications may be running on other devices in the home network such as home personal computers (PCs). These applications need access to the AV architecture and do so by using the basic message passing model of the system. This implies that these applications need a partial implementation of the messaging infrastructure resident on their host node.

GRAPHICS MANAGER 218

The Graphics Manager 218 of FIG. 3 provides a high level API for the management of the user interface (UI) associated with devices. The role of the Graphics Manager 218 is to support the User Interface model by providing a graphics API that is semantically rich. Low level graphics APIs are generally located close to graphic displays and are used by the high level graphics API to provide and support the UI.

DEVICE IDENTIFICATION PROCESSES OF THE PRESENT INVENTION

FIG. 8 illustrates a portion 305b of the HAVI communication architecture and illustrates an application layer 220, a device control module 230 for a particular device 20, the CMM 250, the link driver layer 320, an electronic device 20 coupled to the IEEE 1394 communication bus 30 and the speed map 515 and topology map 520 data structures. The location of the CMM 250 and the link driver layer 320 in the overall architecture of HAVI is shown in interface 305a of FIG. 4.

As described above, the present invention allows high level software programs (e.g., the application layer 220) to reference devices using a persistent identification scheme. Namely, multi-bit persistent Global Unique Identifier numbers (GUIDs) are assigned to each device and contain a vendor portion and a chip series portion. In one embodiment, a 64-bit number is used as the GUID. FIG. 8 illustrates an exemplary communication path whereby the application layer 220 issues a command to cause device 20 to perform some predefined action (e.g., to start "playing" some media). The initial command from the application layer 220 includes an abstract identifier (e.g., "VCR1") of the DCM 230 object and also the action to be done (e.g., "play").

The DCM 230 of FIG. 8 converts the abstract object name into a GUID that matches device 20 and issues another command including the GUID and the action, "play," to the CMM 250. The CMM 250 contains a GUID list 510 in accordance with the present invention. The GUID list 510 is a listing of GUIDs in order of their associated physical identifications (for each respective device). Therefore, the GUID list 510 of the present invention functions as an efficient physical identification to GUID translator and a GUID to physical identification translator. The GUID list 510 is updated by the link driver 320 each time a bus reset event is detected.

The CMM 250, using the GUID list 510, converts the GUID received from the DCM 230 into the corresponding physical identifier for device 20. The CMM 250 then passes a message to the link driver layer 320 including the action command, "play," and the physical identifier corresponding to device 20. The link driver layer 320 interfaces with the local bus 30 using the physical identifier thereby communicating the action command, "play," to the device 20. The speed map 515 and topology map 520 are present for other aspects of the present invention described further below.

Figure 9A:
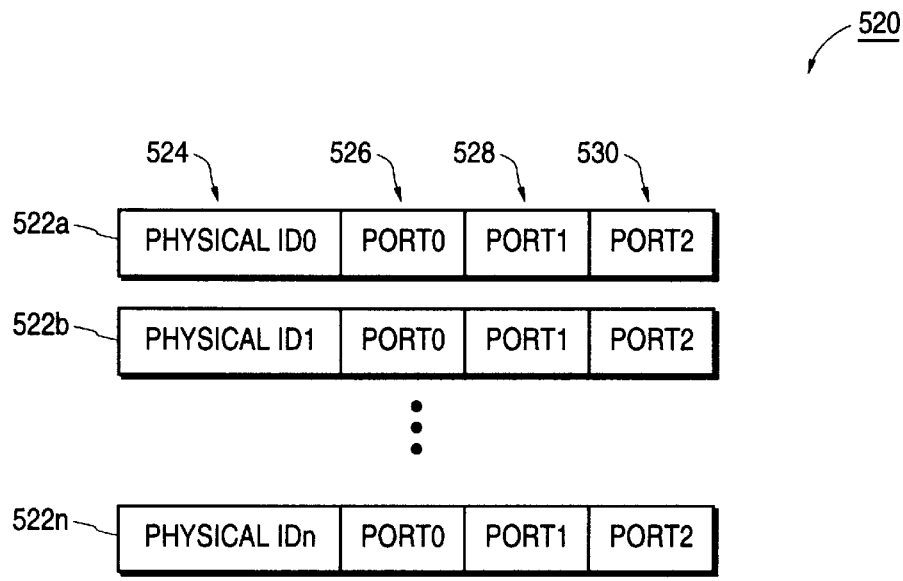
FIG. 9A is an illustration of a physical identifier indexed topology map data structure used by the present invention.
Figure 9B:
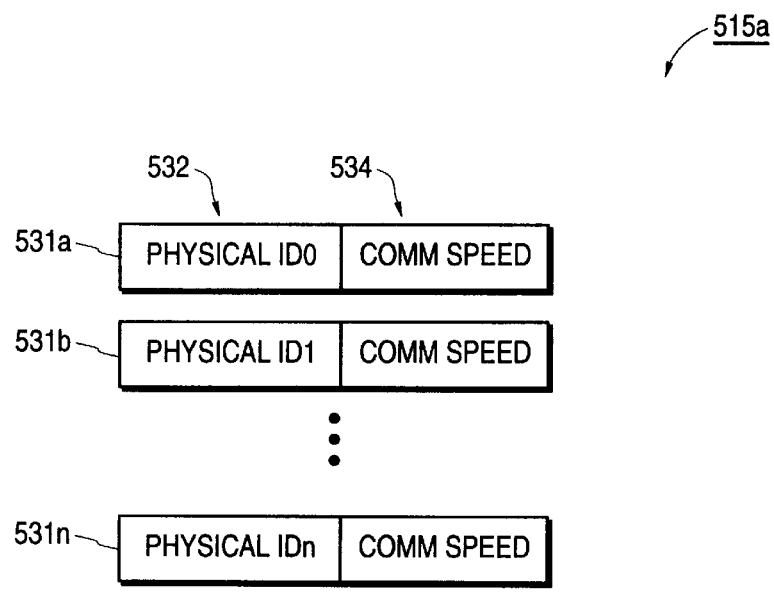
FIG. 9B and FIG. 9C illustrate, respectively, one dimensional and two dimensional physical identifier indexed speed map data structures as used by the present invention.
Figure 9C:
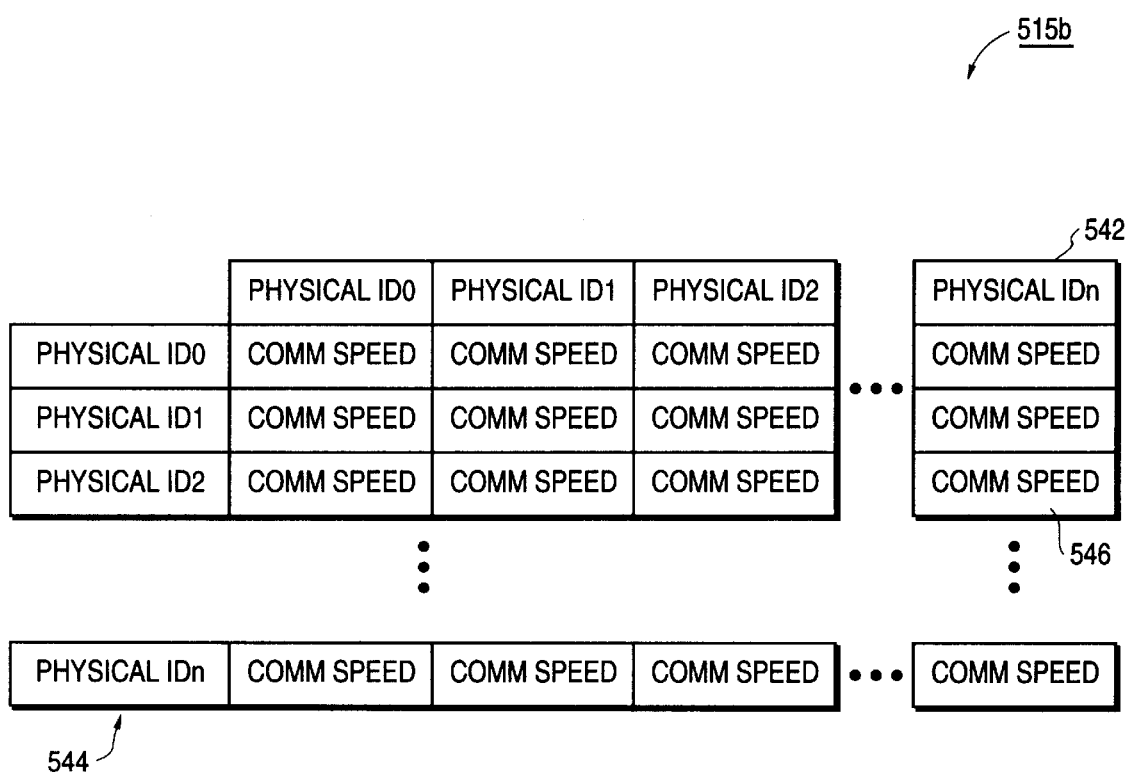

FIG. 9A, FIG. 9B and FIG. 9C illustrate exemplary speed map 515 and topology map 520 data structures. The entries of the speed map 515 and topology map 520 data structures are organized (e.g., ordered or indexed) based on the physical identifier of the devices. The mechanisms for generating the speed map 515 and the topology map 520 data structures are well known within the IEEE 1394 standard.

FIG. 9A illustrates an exemplary topology map 520 data structure used by the present invention. This data structure 520 includes a respective entry (of entries 522a–522n) for each of the n devices coupled to the local bus 30. The first field 524 of each entry corresponds to the device's physical identifier as assigned by the local bus layer 330. As shown in FIG. 9A, the entries 522a–522n are ordered according to their physical identifier e.g., physical_ID0, physical_ID1, . . . , physical_IDn. The following fields 526, 528, 530 for each entry specify port information for each physical port of the device. The port information indicates the physical connection of that port to another port. Using this port information, one can determine the manner in which the n devices of the local bus 30 are physically coupled together in the HAVI network. Topology map 520 data structures of the format shown in FIG. 94 are well known in the art and are re-generated upon each local bus reset.

FIG. 9B illustrates an exemplary one-dimensional speed map data structure 515a used by the present invention. This data structure 515a includes a respective entry (of entries 531a–531n) for each of the n devices coupled to the local bus 30. The first field 532 of each entry corresponds to the device's physical identifier as assigned by the local bus layer 330. As shown in FIG. 9B, the entries 531a–531n are ordered according to their physical identifier, e.g., physical_ID0, physical_ID1, . . . , physical_IDn. Field 534 indicates information pertinent to the communication protocol (including communicate rate) available for the device. Speed map 515a data structures of the format shown in FIG. 9B are well known in the art and are re-generated upon each local bus reset.

FIG. 9C illustrates a two dimensional speed map 515b data structure used by the present invention. Speed map 515b is a matrix where each matrix entry 546 conveys information regarding the communication speed between referenced devices (e.g., devices referenced by phy_id n and phy_id 2). The speed map 515b has a first index 542 and a second index 544, both being ordered according to their physical identifiers. Speed map 515b data structures of the format shown in FIG. 9C are well Known in the art and are re-generated upon each local bus reset.

Figure 10A:
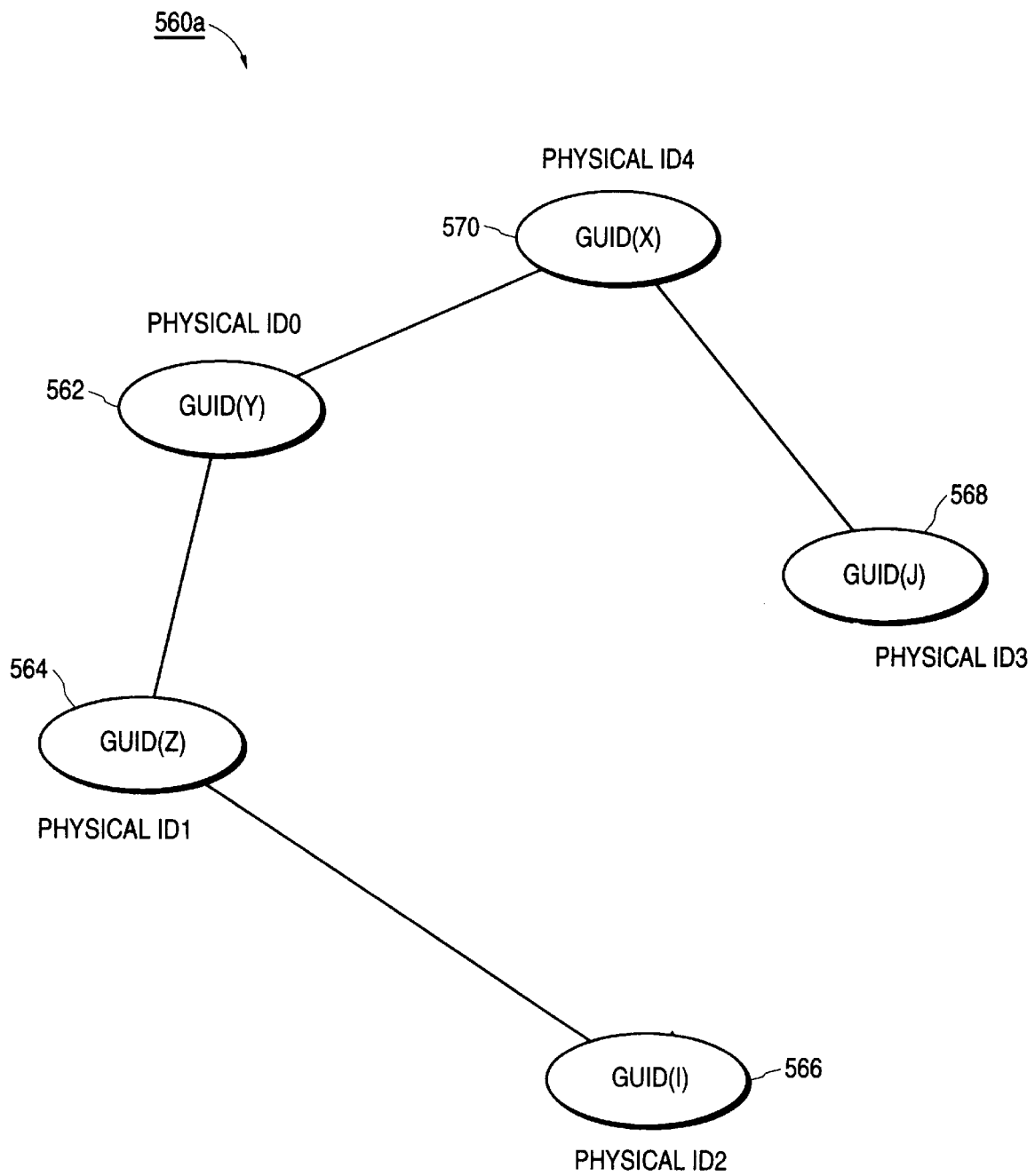
FIG. 10A shows a first exemplary crevice network configuration within the HAVI architecture.

FIG. 10A illustrates an exemplary HAVI network 560a having five devices coupled to the local bus. Device 562 has a physical identifier (0) and a GUID(Y); device 564 has a physical identifier (1) and a GUID(Z); device 566 has a physical identifier (2) and a GUID(I); device 568 has a physical identifier (3) and a GUID(J) and device 570 has a physical identifier (4) and a GUID(X). Each of the GUID values is unique and persistent. The physical identifier values for the devices of FIG. 10A can become reassigned after a local bus reset.

Figure 11A:
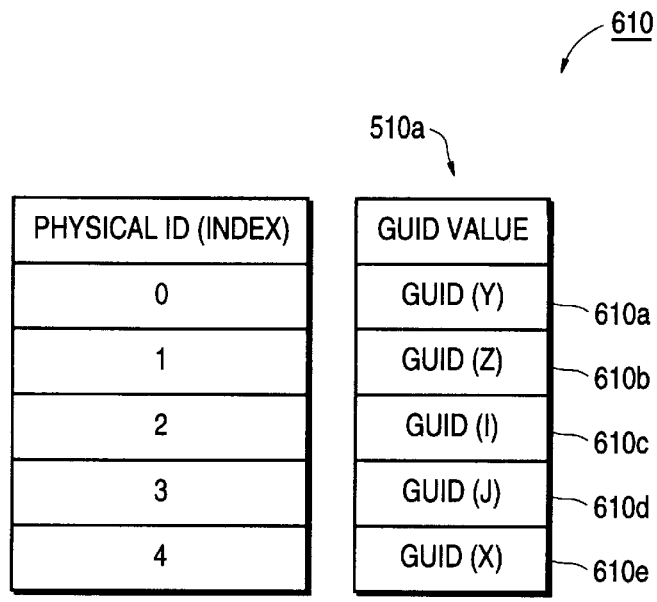
FIG. 11A illustrates a GUID list as constructed by one embodiment of the present invention for the first exemplary device network configuration of FIG. 10A.

FIG. 11A illustrates the resulting GUID list 510a compiled by the present invention based on the exemplary HAVI network 560a of FIG. 10A. The GUID list 510a contains five entries, one for each device of the HAVI network. As shown, the GUID values in the GUID list 510a are ordered, e.g., GUID(Y); GUID(Z); GUID(I); GUID(J); and GUID (X), according to the corresponding physical identification values, 0, 1, 2, 3 and 4, respectively. In one embodiment, GUID list 510a is compiled by the link driver 320 and stored in computer readable memory.

Figure 10B:
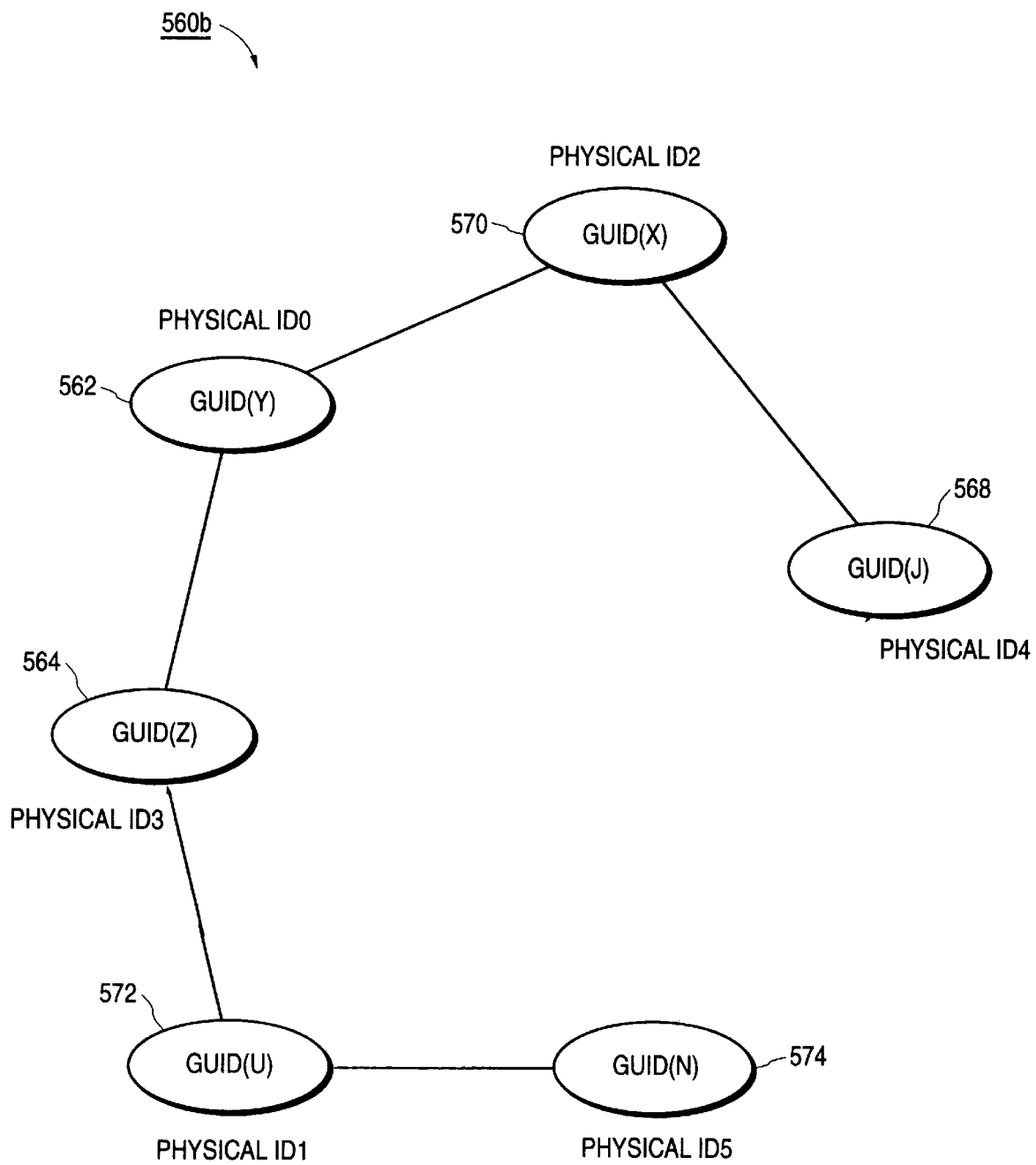
FIG. 10B shows a second exemplary device network configuration within the HAVI architecture.

FIG. 10B illustrates another exemplary HAVI network 560b having six devices coupled to the local bus. Network 560b is similar to network 560a except device 566 is removed and devices 572 and 574 are added. In network 560b, device 572 has a physical identifier (1) and a GUID (U) and device 574 has a physical identifier (5) and a GUID(N). Some of the physical identifier values between FIG. 10A and FIG. 10B have seen reassigned due to a local bus reset. The reassigned physical identifiers for the remaining devices are as follows: device 562 has physical identifier (0), device 564 has physical identifier (3), device 568 has physical identifier (4) and device 570 has physical identifier (2). Each of the GUID values is unique and persistent for all devices.

Figure 11B:
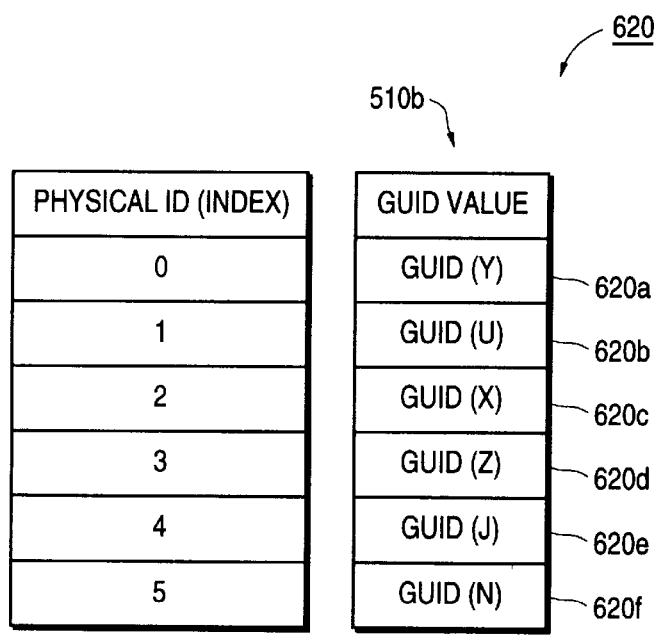
FIG. 11B illustrates a GUID list as constructed by one embodiment of the present invention for the second exemplary device network configuration of FIG. 10B.

FIG. 11B illustrates the resulting GUID list 510b compiled by the present invention based on the exemplary HAVI network 560b of FIG. 10B. The GUID list 510b contains six entries, one for each device of the HAVI network 560b. As shown, the GUID values in the GUID list 510b are ordered, e.g., GUID(Y); GUID(U); GUID(X); GUID(Z); GUID(J) and GUID(N), according to the corresponding physical identification values 0, 1, 2, 3, 4 and 5, respectively. In one embodiment, the GUID list 510b is compiled by the link driver 320 and stored in computer readable memory.

FIG. 12A illustrates a GUID status table 630 generated by the CMM 250 of the present invention each time a local bus reset is generated. The GUID status table 630 includes entries 632a–632g regarding (1) which devices remain connected to the local bus 30 since the last GUID list 510 was compiled, e.g., after a local bus reset, (2) which devices have been just removed and (3) which devices have been just added since the last GUID list 510 was compiled. A first field 632 represents the GUID value of the device and an associated field 634 represents the current status of that device. FIG. 12A represents an exemplary table 630 generated by CMM 250 as a result of the exemplary configurations of FIG. 10A and FIG. 10B. As shown in table 630, the devices having GUID(Y), GUID(X), GUID(Z), and GUID(J) remain after the local bus reset. However, the devices having GUID(U), and GUID(N) have been added after the local bus reset and the device having GUID(I) was removed after the local bus reset. In one embodiment, the GUID table 630 is compiled by the CMM 250 and stored in computer readable memory.

FIG. 12B illustrates a subset status table 650 generated by the CMM 250 which contains entries 652a–652b indicating only which devices have been added to the local bus 30 since the last GUID list 510 was compiled. Likewise, FIG. 12C illustrates a subset status table 660 generated by the CMM 250 which contains entries (662a) indicating only which devices have been removed from the local bus 30 since the last GUID list 510 was compiled. In one embodiment, the GUID tables 650–660 are compiled by the CMM 250 and stored in computer readable memory. Device status tables 630, 650 and 660 are forwarded to objects within the HAVI architecture that establish callback handlers within the CMM 250 to receive this information.

Figure 13:
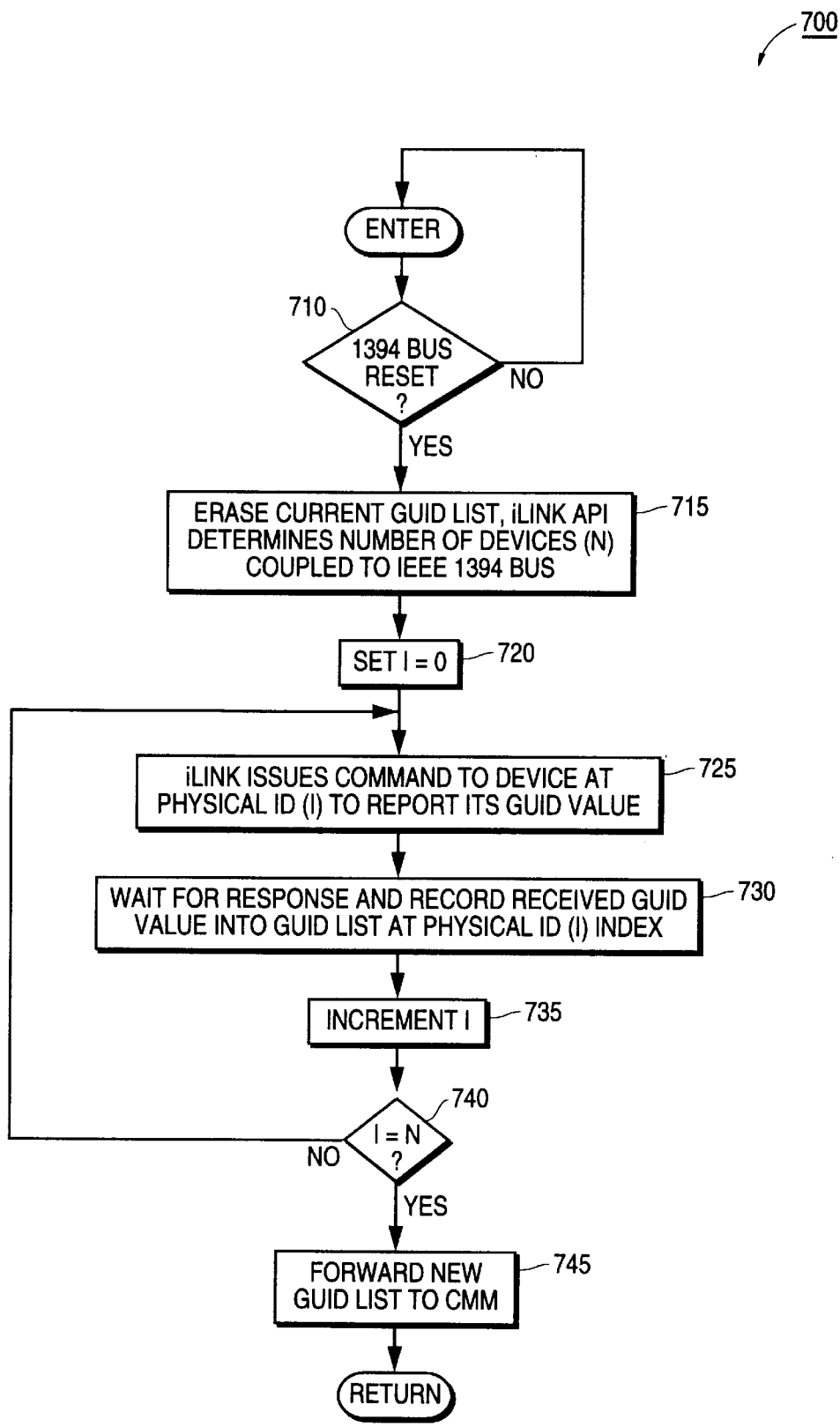
FIG. 13 is a flow diagram illustrating steps performed by the present invention for constructing a GUID list in response to a local bus reset.

FIG. 13 illustrates a flow diagram 700 of the steps performed by the link driver 320 of the present invention for compiling a current GUID table 510 in response to a local bus reset. After a local bus reset, physical identifiers of devices are reassigned by the local bus 30 At step 710, if a local bus reset is reported to the link driver 320, then step 713 is entered. At step 715, current GUID list is erased and the link driver 320 determines the number of devices, n, that are currently coupled to the local bus 30. A number of well known mechanisms can be used to implement step 715. At step 720, a counter is set to zero. At step 725, the link layer 320 issues a request to the device coupled to the local bus 30 and having the physical identifier corresponding to the counter value. The request is for the GUID value of this device. At this point, the link layer 320 is unaware which device this is.

At step 730, the link layer 320 receives the return GUID value from the device with the physical identifier of the counter value and places this GUID value into a next entry of the current GUID list 510 (the entry position also corresponds to the counter value). At step 735, the counter is incremented by one. At step 740, a check is made if the counter is equal to n (the maximum number of devices on the local bus). If not, then step 725 is entered again to continue compiling the current GUID list. If so, then at step 745, the link layer 320 forwards the CMM 250 a copy of the current GUID list 510. It is appreciated that physical identifiers are assigned by the local bus 30 from 0 to (n−1) values. After process 700, a current GUID list 510 like those shown in FIG. 11A and FIG. 11B is compiled.

Figure 14:
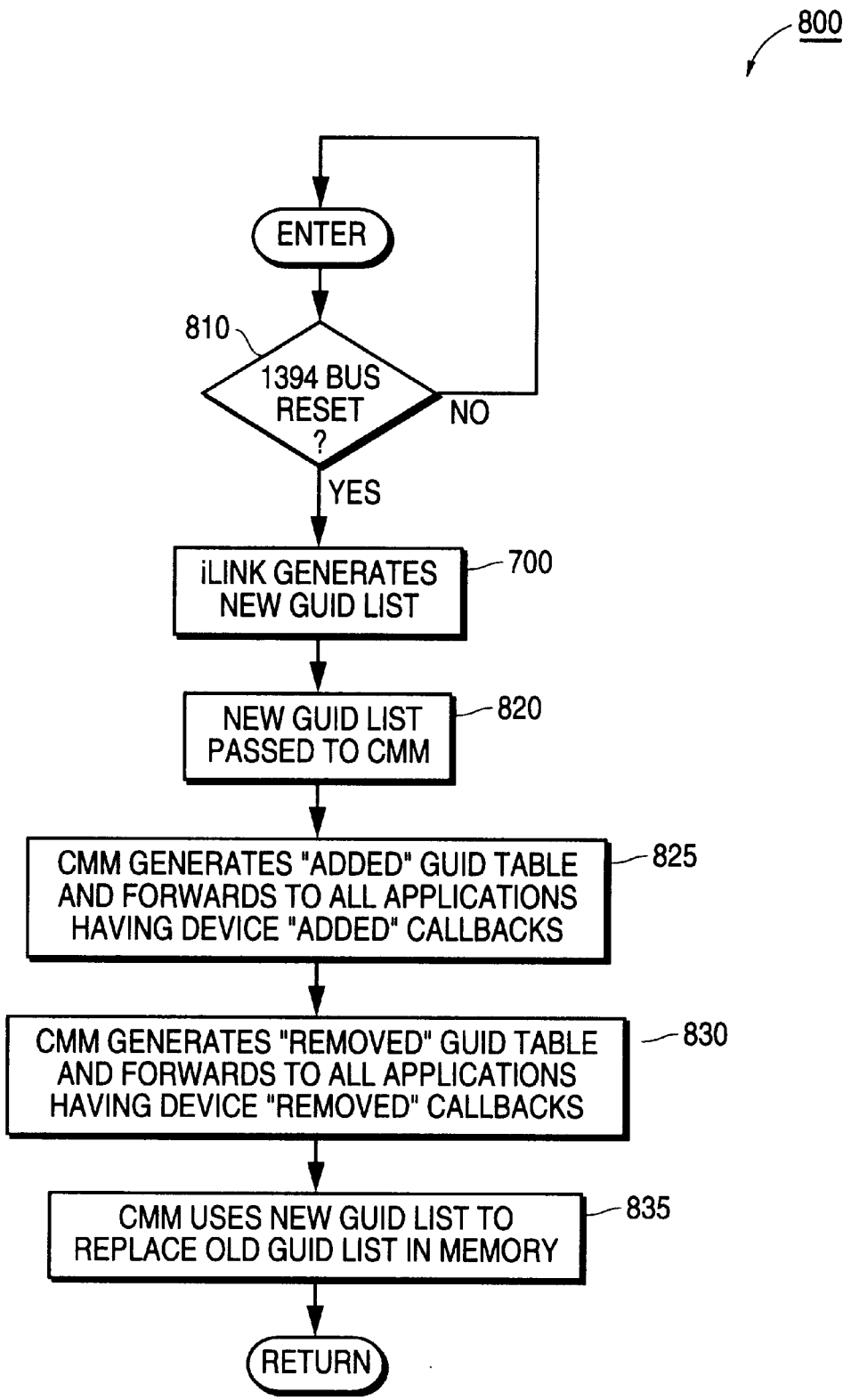
FIG. 14 is a flow diagram illustrating steps performed by the present invention for constructing and communicating the GUID update status lists in response to a local bus reset.

FIG. 14 illustrates a flow diagram 800 of the steps performed by the Link layer 320 and the CMM 250 of the present invention for compiling the device status tables 630, 650, 660 in response to a local bus reset. As discussed above, process 700 generates a current GUID list 510 in response to a local bus reset and passes the current list to the CMM 250 At step 820, the current GUID list is received and the last GUID list received by the CMM 250 is retained and marked as a "previous" GUID list. At step 825, the CMM 250 compares the entries of the previous GUID list and the current GUID list 510 and generates GUID table 650 based on the new GUID values that are present in the current GUID list 510 but not in the previous GUID list. Any object w thin the HAVI architecture that previously established a callback handler with the Event Manager 214 for the information of table 650 is sent a message including the status information of table 650.

At step 830, the CMM 250 compares the entries of the previous GUID list and the current GUID list 510 and generates GUID table 660 based on any GUID values that are no longer present in the current GUID list 510 but were present in the previous GUID list. Any object within the HAVI architecture that previously established a callback handler with the Event Manager 214 for the information of table 660 is sent a message including the status information of table 660. Optionally, at step 830, the information from tables 660 and 650 can be combined with the GUID values that are common to both the previous and current GUID lists thereby generating table 630. At step 835, the CMM 250 erases the previous GUID list and uses only the current GUID list 510. By performing process 800, the CMM 250 and the link layer 320 of the present invention eliminate the burden from higher level application programs of tracking which devices are on the local bus while providing the high level application programs with device status information.

Figure 15A:
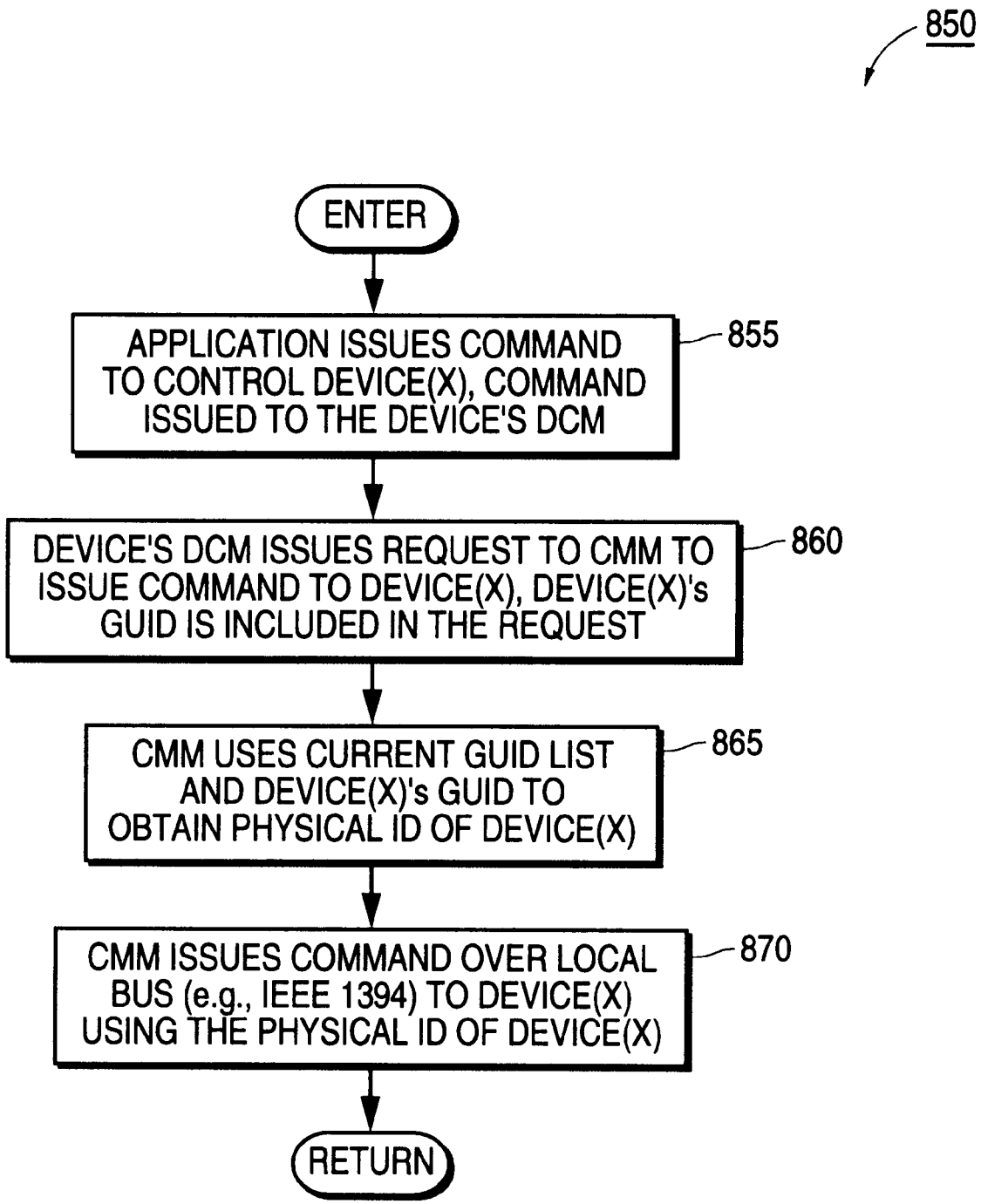
FIG. 15A is a flow diagram illustrating the use of the GUID list in accordance with the present invention for sending a message to a device.

FIG. 15A illustrates a flow diagram 850 of steps performed by the present invention for translating GUID values into physical identifications using the GUID list 510 passed to the CMM 250. At step 855, an application program issues a command to control a device(x) and this command is received by the DCM of the device(x). At step 860, the DCM issues a command to the CMM 250 including device(x)'s GUID value which is known to the DCM. At step 865, the CMM 250 determines the index (e.g., entry order) of the device(x)'s GUID within the GUID list 510. This value is the physical identifier of device(x). At step 870, the CMM 250 issues a command to the link driver layer 320 including device(x)'s physical identifier and an action command The link driver layer 320 then commands device(x) using the received physical identifier. Using process 850, high level applications do not need to be aware of a device's physical identifier but can use the constant GUID value.

Figure 15B:
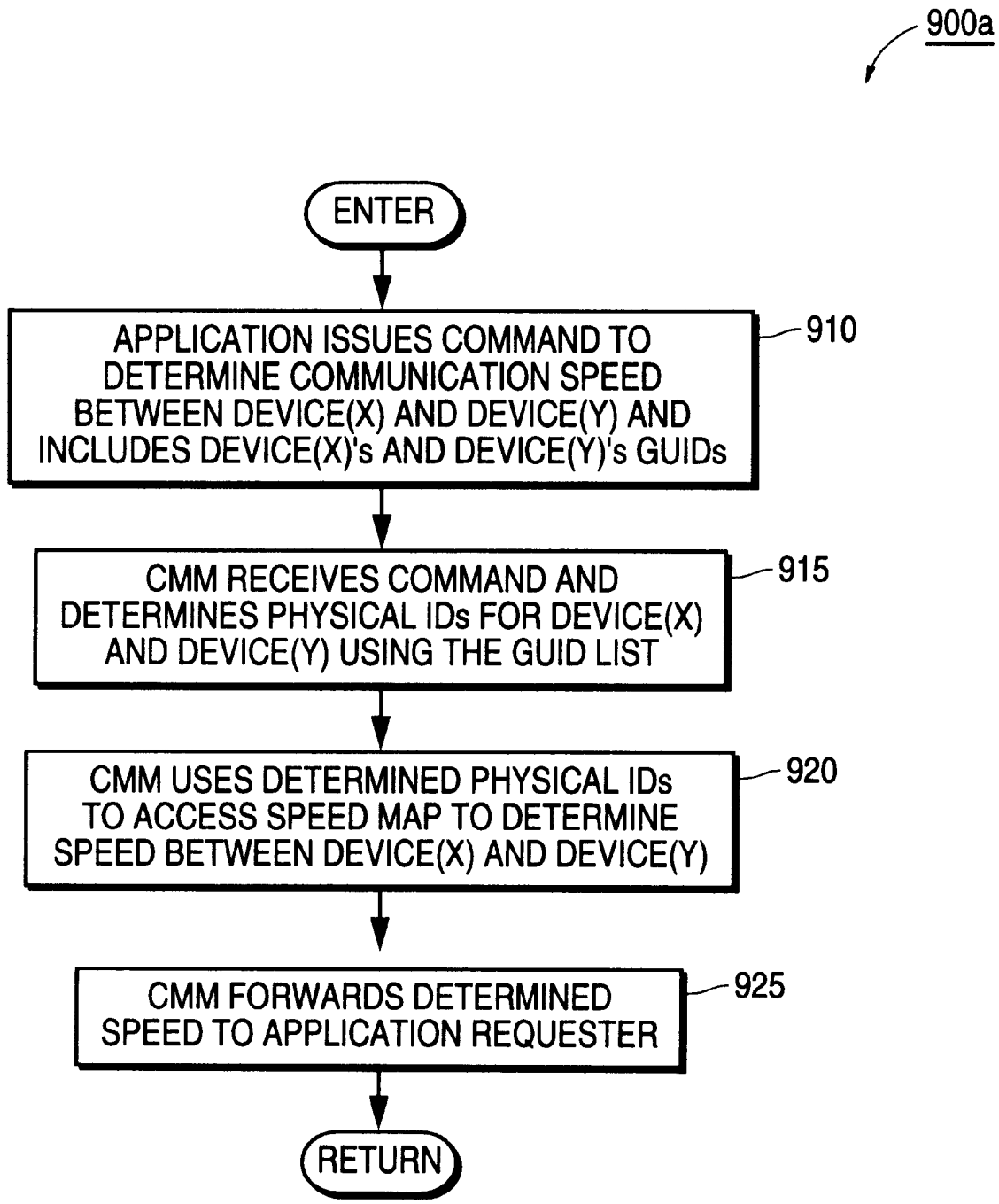
FIG. 15B illustrates the use of the GUID list to provide an index in accordance with the present invention for accessing the speed map to determine communication speed information.

FIG. 15B illustrates a flow diagram 900a of steps performed by the present invention for accessing speed map information with respect to two devices given their GUIDs. At step 910, an application layer issues a command to determine the communication speed supported between device(x) and device(y). The request includes the GUID values for device(x) and device(y). At step 915, the CMM 250 receives this command and the GUID values. The CMM 250 translates the GUID values into two physical identifiers based on the index of the GUIDs within the GUID list 510. At step 920, the CMM 250 then accesses (e.g., indexes) a two dimensional speed map data structure 515b with the obtained two physical identifiers. The speed map thereby returns the proper speed information. At step 925, the CMM 250 forwards the determined speed information to the requesting application layer.

Figure 15C:
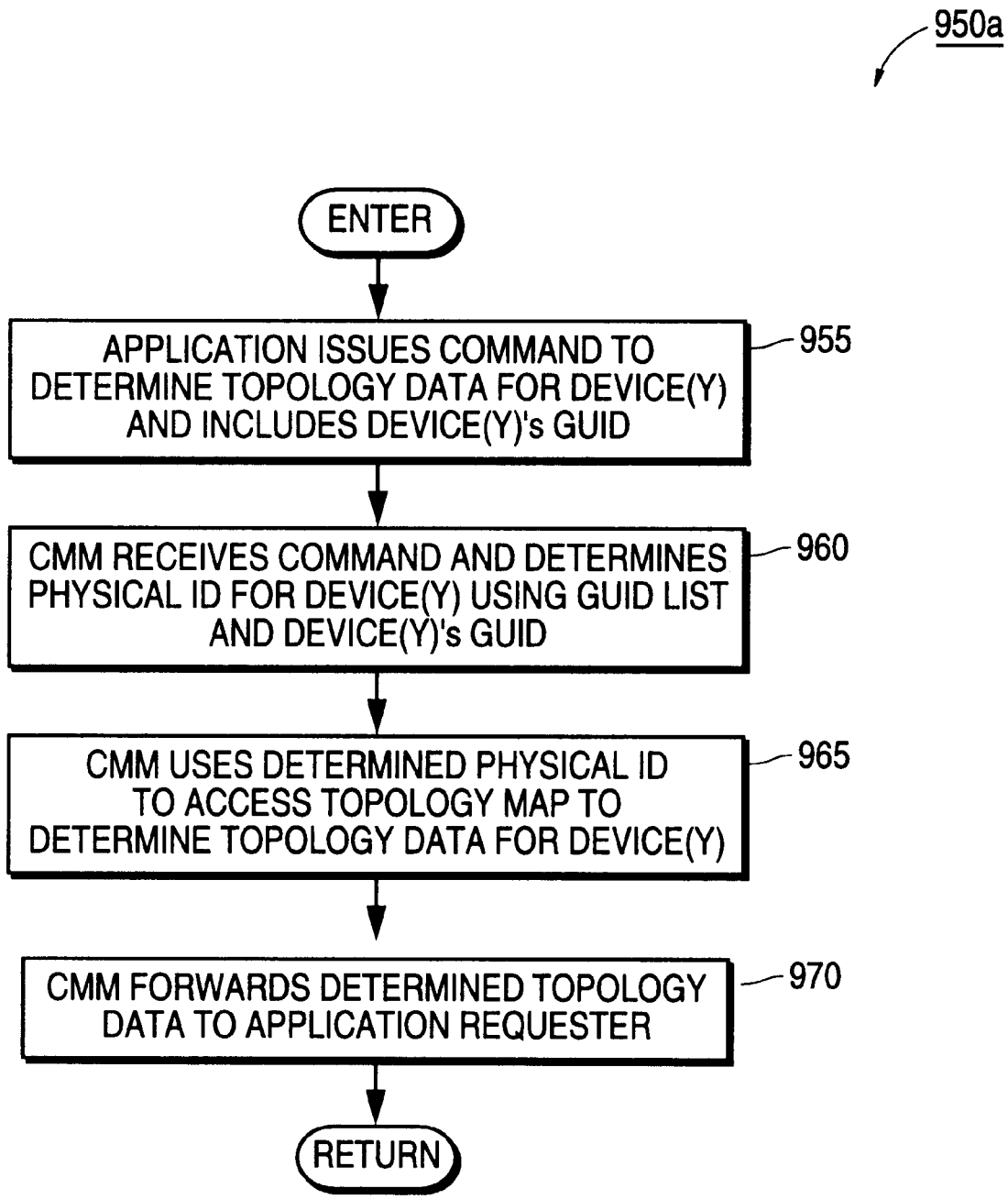
FIG. 15C illustrates the use of the GUID list to provide an index in accordance with the present invention for accessing the topology map to determine topology information.

FIG. 15C illustrates a flow diagram 950a of steps performed by the present invention for accessing topology map information with respect to a device given its GUID value. At step 955, an application layer issues a command to determine the topology of a device(y). The request includes the GUID value for device(y). At step 960, the CMM 250 receives this command and the GUID value. The CMM 250 translates the GUID value into a physical identifier based on the index of the GUID within the GUID list 510. At step 965, the CMM 250 then accesses (e.g., indexes) a topology data structure 520 with the obtained physical identifier. The topology map thereby returns the proper topology information for device(y). At step 970, the CMM 250 forwards the determined topology information to the requesting application layer.

Figure 15D:
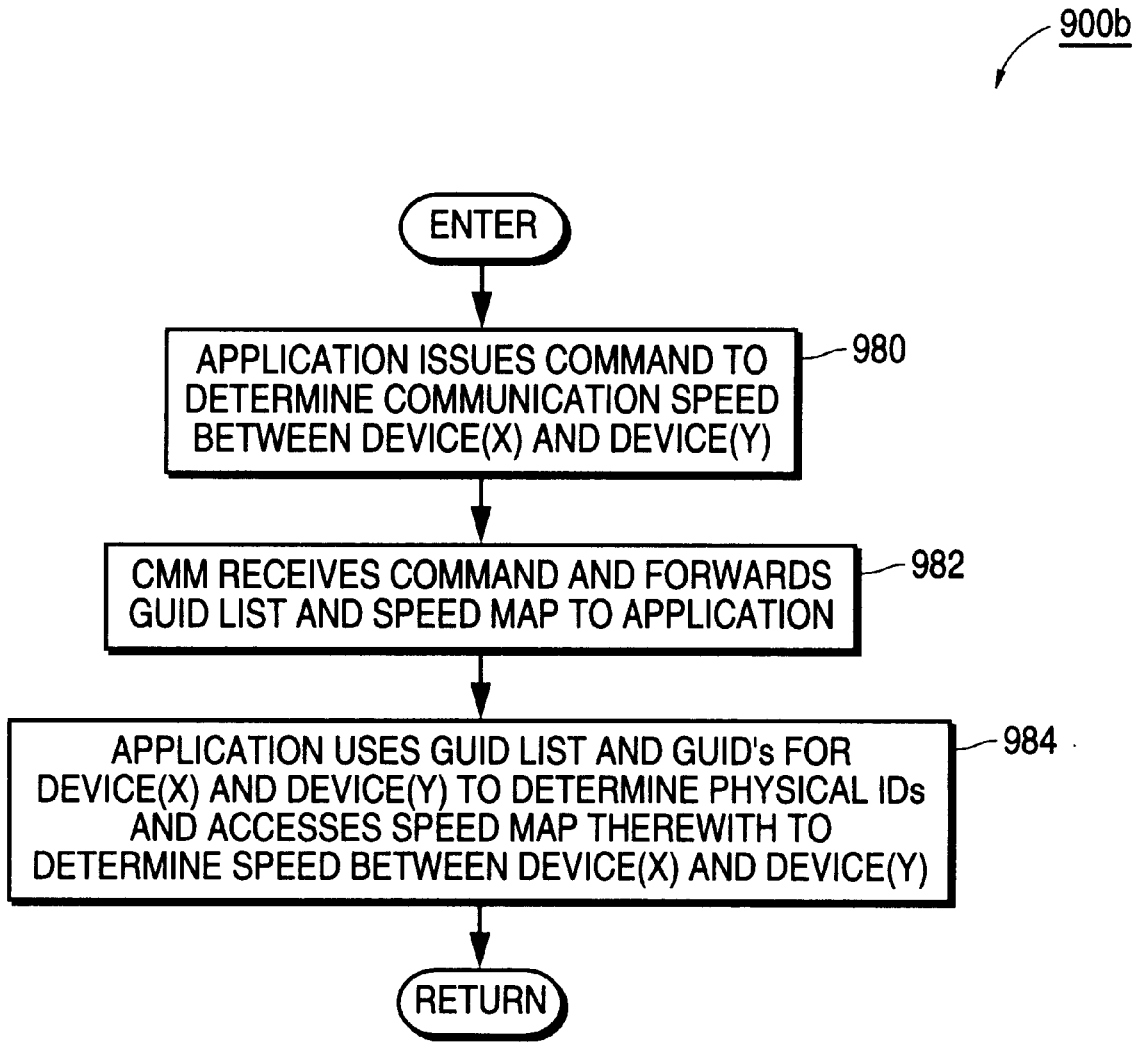
FIG. 15D illustrates the use of the GUID list to provide an index in accordance with the present invention for accessing the speed map to determine communication speed information where the application references the speed map.

FIG. 15D illustrates a flow diagram 900b of steps performed by the present invention for accessing speed map information with respect to two devices given their GUIDs. The difference between process 900b and 900a (FIG. 15A) is that the application program determines the speed information, not the CMM 250. At step 980, an application layer issues a command to determine the communication speed between device(x) and device(y). At step 982, the CMM 250 receives this command and forwards the current GUID list 510 as well as a copy of the speed map 515b (or pointers to these data structures) to the application program. At step 984, the application program translates the GUID values of the two devices into two physical identifiers based on the index of the GUIDs within the GUID list 510. The application program then accesses (e.g., indexes) the two dimensional speed map data structure 515b with the obtained two physical identifiers. The speed map thereby returns the proper speed information.

Figure 15E:
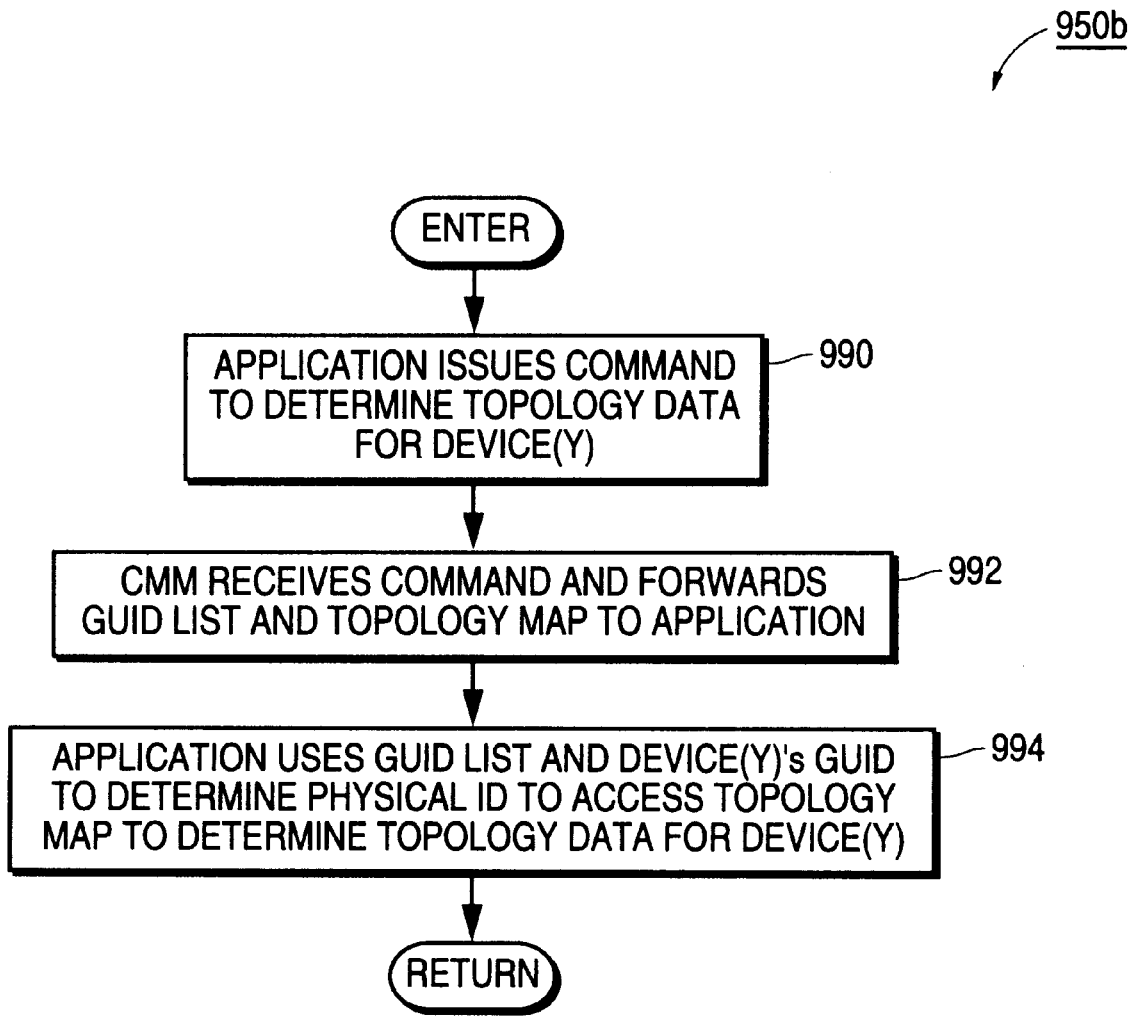
FIG. 15E illustrates the use of the GUID list to provide an index in accordance with the present invention for accessing the topology map to determine topology information where the application references the topology map.

FIG. 15E illustrates a flow diagram 950b of steps performed by the present invention for accessing topology information with respect to a device given its GUID. The difference between process 950b and 950a (FIG. 15B) is that the application program determines the topology information, not the CMM 250. At step 990, an application layer issues a command to determine the topology information of device(y). At step 992, the CMM 250 receives this command and forwards the current GUID list 510 as well as a copy of the topology map 520 (or a pointer to this data structure) to the application program. At step 994, the application program translates the GUID value of the device (y) into a physical identifier based on the index of the GUID within the GUID list 510. The application program then accesses (e.g., indexes) the topology data structure 520 with the obtained physical identifier. The topology map thereby returns the proper topology information.

It is appreciated that by providing the GUID list 510, the present invention allows high level applications to utilize persistent device identifiers (GUIDs) to references devices. Upon a bus reset, the high level devices are not burdened with the reassignments of physical identifiers that are done at the local bus level. The GUID list 510 is particularly efficient by organizing the ordering of GUIDs to conform to the physical identifier value. This reduces memory required to store the GUID list 510 and creates an efficient index mechanism.

The preferred embodiments of the present invention, a method and system for updating device identification and status information in response to a local bus reset within a home audio/video network, are thus described. While the present invention has been described in particular embodiments, it should be appreciated that the present invention should not be construed as limited by such embodiments, but rather construed according to the below claims.

What is claimed is:

1. A method of providing device status information within a communication network, said method comprising the steps of:
   a) constructing a current list of global unique identifiers (GUIDs) by ordering respective GUIDs within said current list of GUIDs according to their associated physical identifier values where n said physical identifier values are assigned by a local bus of said network and each GUID of said current list of GUIDs identifies a unique device coupled within said network;
   b) forwarding said current list of GUIDs to a high level software program;
   c) said high level software program comparing said current list of GUIDs with a previous list of GUIDs to generate a list of newly added devices to said network and of newly removed devices from said network;
   d) forwarding said list to a device within said network that previously established a call back handler with said high level software program for device status information; and
   e) repeating steps a)–d) in response to each local bus reset.

2. A method as described in claim 1 wherein each GUID is a persistent multi-bit value comprising a vendor code portion and a chip series code portion.

3. A method as described in claim 1 wherein said network is a network of the home audio/visual initiative (HAVI) architecture and wherein said local bus is of the IEEE 1394 standard.

4. A method as described in claim 1 wherein said step c) further comprises the step of said high level software program replacing said previous list of GUIDs with said current list of GUIDs after said comparing.

5. A method as described in claim 1 further comprising the step of said local bus renumbering physical identifiers of devices of said network that are coupled to said local bus in response to a local bus reset.

6. A method as described in claim 5 wherein said step a) comprises the steps of:
   a1) receiving from said local bus an indication of the number of devices of said local bus;
   a2) starting with physical identifier zero and incrementing to a last physical identifier corresponding to said number of devices of said local bus, forwarding requests to said devices of said local bus individually requesting their GUIDs;
   a3) recording into said current list of GUIDs any GUIDs returned from said devices of said local bus, said GUIDs recorded into positions said current list of GUIDs based on their corresponding physical identifier values; and
   a4) storing said current list of GUIDs into a computer readable memory unit.

7. A method of providing device status information within a communication network, said method comprising the steps of:
   a) constructing a current list of global unique identifiers (GUIDs) by ordering respective GUIDs within said current list of GUIDs according to their associated physical identifier values, said physical identifier values assigned by a local bus of said network and wherein each GUID of said current list of GUIDs identifies a unique device coupled within said network, said step a) performed by first software;
   b) said first software forwarding said current list of GUIDs to second software;
   c) said second software comparing said current list of GUIDs with a previous list of GUIDs to generate a first list of newly added devices to said communication network and a second list of newly removed devices from said network;
   d) forwarding said first list and said second list to a device within said communication network that previously established a call back handler with said second software for device status information; and
   e) repeating steps a)–d) in response to each local bus reset.

8. A method as described in claim 7 wherein each GUID is a persistent multi-bit value comprising a vendor code portion and a chip series code portion.

9. A method as described in claim 7 wherein said network is a network of the home audio/visual initiative (HAVI) architecture and wherein said local bus is of the IEEE 1394 standard.

10. A method as described in claim 7 wherein said step c) further comprises the step of said second software replacing said previous list of GUIDs with said current list of GUIDs after said comparing.

11. A method as described in claim 7 further comprising the step of said local bus renumbering physical identifiers of devices of said network that are coupled to said local bus in response to a local bus reset.

12. A method as described in claim 11 wherein said step a) comprises the steps of:
   a1) receiving from said local bus an indication of the number of devices of said local bus;
   a2) starting with physical identifier zero and incrementing to a last physical identifier corresponding to said number of devices of said local bus, forwarding requests to said devices of said local bus individually requesting their GUIDs;
   a3) recording into said current list of GUIDs any GUIDs returned from said devices of said local bus, said GUIDs recorded into positions said current list of GUIDs based on their corresponding physical identifier values; and
   a4) storing said current list of GUIDs into a computer readable memory unit.

13. An electronic system having a processor, a bus and a computer readable memory unit, said system coupled to a local bus, said memory unit having instructions stored therein that implement a method of providing device status information, said method comprising the steps of:
   a) constructing a current list of global unique identifiers (GUIDs) by ordering respective GUIDs within said current list of GUIDs according to their associated physical identifier values wherein said physical identifier values are assigned by said local bus and each GUID of said current list of GUIDs identifies a unique device;

b) forwarding said current list of GUIDs to a high level software program;

c) said high level software program comparing said current list of GUIDs with a previous list of GUIDs to generate a list of newly added devices to said network and of newly removed devices from said network;

d) forwarding said list to a device within said network that previously established a call back handler with said high level software program for device status information; and e) repeating steps a)–d) in response to each local bus reset.

14. An electronic system as described in claim 13 wherein each GUID is a persistent multi-bit value comprising a vendor code portion and a chip series code portion.

15. An electronic system as described in claim 13 wherein said network is a network of the home audio/visual initiative (HAVI) architecture and wherein said local bus is of the IEEE 1394 standard.

16. An electronic system as described in claim 13 wherein said step c) further comprises the step of said high level software program replacing said previous list of GUIDs with said current list of GUIDs after said comparing.

17. An electronic system as described in claim 14 wherein said method further comprises the step of said local bus renumbering physical identifiers of devices of said network that are coupled to said local bus in response to a local bus reset.

18. An electronic system as described in claim 17 wherein said step a) comprises the steps of:

a1) receiving from said local bus an indication of the number of devices of said local bus;

a2) starting with physical identifier zero and incrementing to a last physical identifier corresponding to said number of devices of said local bus, forwarding requests to said devices of said local bus individually requesting their GUIDs;

a3) recording into said current list of GUIDs any GUIDs returned from said devices of said local bus, said GUIDs recorded into positions said current list of GUIDs based on their corresponding physical identifier values; and a4) storing said current list of GUIDs into a computer readable memory unit.

19. An apparatus for providing device status information within a communication network, said apparatus comprising:

a) means for constructing a current list of global unique identifiers (GUIDs) by ordering respective GUIDs within said current list of GUIDs according to their associated physical identifier values wherein said physical identifier values are assigned by a local bus of said network and each GUID of said current list of GUIDs identifies a unique device coupled within said network;

b) means for forwarding said current list of GUIDs to a high level software program;

c) said high level software program comparing said current list of GUIDs with a previous list of GUIDs to generate a list of newly added devices to said network and of newly removed devices from said network;

d) said high level software program forwarding said list to a device within said network that previously established a call back handler with said high level software program for device status information; and e) means for repeating steps a)–d) in response to each local bus reset.

20. An apparatus as described in claim 19 wherein said means for constructing comprises:

means for receiving from said local bus an indication of the number of devices of said local bus;

means for starting with physical identifier zero and incrementing to a last physical identifier corresponding to said number of devices of said local bus, forwarding requests to said devices of said local bus individually requesting their GUIDs;

means for recording into said current list of GUIDs any GUIDs returned from said devices of said local bus, said GUIDs recorded into positions said current list of GUIDs based on their corresponding physical identifier values; and means for storing said current list of GUIDs into a computer readable memory unit.

* * * * *